US007651716B2

(12) United States Patent
Davis et al.

(10) Patent No.: US 7,651,716 B2
(45) Date of Patent: *Jan. 26, 2010

(54) METHODS FOR REDUCING ADVERSE EFFECTS OF FEEDING FORMULA TO INFANTS

(75) Inventors: Anne Marie M. Davis, Philadelphia, PA (US); Charles F. Kuhlman, Media, PA (US)

(73) Assignee: Wyeth LLC, Madison, NJ (US)

( * ) Notice: Subject to any disclaimer, the term of this patent is extended or adjusted under 35 U.S.C. 154(b) by 1014 days.

This patent is subject to a terminal disclaimer.

(21) Appl. No.: 11/064,994

(22) Filed: Feb. 24, 2005

(65) Prior Publication Data
US 2005/0142249 A1  Jun. 30, 2005

Related U.S. Application Data

(63) Continuation-in-part of application No. 10/318,977, filed on Dec. 13, 2002, now Pat. No. 6,913,778.

(60) Provisional application No. 60/343,253, filed on Dec. 21, 2001.

(51) Int. Cl.
A23L 1/015 (2006.01)
(52) U.S. Cl. .................... 426/583; 426/585; 426/656; 426/801
(58) Field of Classification Search ................ 426/580, 426/583, 656, 801
See application file for complete search history.

(56) References Cited

U.S. PATENT DOCUMENTS

| 4,303,692 | A | * | 12/1981 | Gaull ..................... 426/580 |
| 4,485,040 | A | | 11/1984 | Roger et al. |
| 4,879,131 | A | | 11/1989 | De Rahm |
| 5,169,666 | A | | 12/1992 | Woychik |
| 5,420,249 | A | | 5/1995 | de Wit et al. |
| 5,436,020 | A | | 7/1995 | Kuwata et al. |
| 5,455,331 | A | | 10/1995 | Pearce |
| 5,503,864 | A | | 4/1996 | Uchida et al. |

(Continued)

FOREIGN PATENT DOCUMENTS

CA  1243887  * 11/1988

(Continued)

OTHER PUBLICATIONS

Alarcon PA, Tressler RL, Mulvaney A, Lam W, Comer GM, "Gastrointestinal tolerance of a new infant milk formula in healthy babies: an international study conducted in 17 countries," *Nutrition* 2002;18:484-489.

(Continued)

*Primary Examiner*—Helen F Pratt
(74) *Attorney, Agent, or Firm*—Joseph M. Mazzarese; Darryl L. Webster

(57) ABSTRACT

Methods for reducing side-effects of feeding an individual are provided. The methods comprise administering to the individual a composition comprising an amount of bovine milk providing 1.0 to 1.2 grams of protein per 100 available kilocalories and an amount of a bovine whey material providing 1.0 to 1.2 grams of protein per 100 available kilocalories, said bovine whey material having an alpha-lactalbumin content of 28% to 40% and a beta-lactoglobulin content of 8% to 33% of total protein.

19 Claims, 5 Drawing Sheets

U.S. PATENT DOCUMENTS

| | | | |
|---|---|---|---|
| 5,686,491 | A | 11/1997 | Sherwood |
| 5,756,680 | A | 5/1998 | Ahmed et al. |
| 5,795,611 | A | 8/1998 | Slattery |
| 6,020,015 | A | 2/2000 | Gaull |
| 6,312,755 | B1 | 11/2001 | Wu |
| 6,630,452 | B2 | 10/2003 | Wilson |
| 2003/0124237 | A1 | 7/2003 | Kuhlman et al. |

FOREIGN PATENT DOCUMENTS

| | | |
|---|---|---|
| EP | 0311283 | 4/1989 |
| EP | 0604684 | 7/1994 |
| EP | 0 951 842 B1 | 12/2002 |
| WO | WO 95/19714 A1 | 7/1995 |
| WO | WO 01/05243 A1 | 1/2001 |
| WO | WO 02/28194 | 4/2002 |

OTHER PUBLICATIONS

Bier DM, "Amino acid pharmacokinetics and safety assessment," *J Nutr* 2003;2034S-2039S.

Brosnan JT "Interorgan amino acid transport and its regulation," *J Nutr* 2003;133:2068S-2072S.

Cynober LA "Plasma amino acid levels with a note on membrane transport: characteristics, regulation, and metabolic significance," *Nutrition* 2002;18:761-766.

Darling PB, Dunn M, Sawar Gilani G, Ball RO, Pencharz PB, "Phenylalnine kinetics differ between formula-fed and human milk-fed preterm infants," *J Nutr* 2004;134:2540-2545.

Darling PB, Dunn M, Sarwar G, Brookes S, Ball OR, Pencharz PB, "Threonine kinetics in preterm infants fed their mother's milk or formula with various ratios of whey to casein," *Am J Clin Nutr* 1999;69:105-114.

de Wit, J. N., "Nutritional and Functional Characteristics of Whey Proteins in Food Products," *Journal of Dairy Science* 81: 597-608 (1998).

Dibley MJ, Goldsby JB, Staehling NW, et al. Trowbridge FL, "Development of normalized curves for the international growth reference: historical and technical considerations," *Am J Clin Nutr* 1987;46:736-48.

*Dietary Reference Intakes for Energy, Carbohydrate, Fiber, Fat, Fatty Acids, Cholesterol, Protein, and Amino acids (Macronutrients)*. Washington DC: National Academy Press, 2002.

Donovan SM, Lonnerdal B., "Non-protein nitrogen and true protein in infant formulas," *Acta Paediatr Scand* 1989;78:497-504.

Fazzolari-Nesci et al, "Tryptophan Fortification of Adapted Formula Increasing Plasma Tryptophan Concentrations to Levels Not Different from Those Found in Breast-Fed Infants," *Journal of Ped. Gastro and Nut.*, 14:456-459 (1992).

Fernstrom et al, "Brain Serotonin Content: Physiological Regulation by Plasma Neutral Amino Acids," *Science*, 178: 414-415 (1972).

Fomon SJ, Ziegler EE, Nelson SE, Rogers RR, Frantz JA. "Infant formula with protein-energy ratio of 1.7 g/100 kcal is adequate but may not be safe," *JPGN* 1999;28:495-501.

Fomon SJ, Ziegler EE, Nelson SE, Frantz JA, "What is the safe protein-energy ratio for infant formulas?" *Am J Clin Nutr* 1995;62:358-363.

Heine et al., "Alpha-Lactalbumin-enriched low protein infant formulas: a comparison to breast milk feeding," *Acta Paediatr.* (1996) 85:1024-1028.

Jarvenpaa, A. L., N. C. Raiha, et al., "Milk protein quantity and quality in the term infant. I. Metabolic responses and effects on growth", *Pediatrics* 70(2): 214-20 (1982).

Johnson TA, Engstrom JL, Gelhar DK, "Infra- and inter-examiner reliability of anthorpometric measurements of term infants," *JPGN* 1997;24:497-505.

Kelleher et al., "Glycomacropeptide and alpha-lactalbumin supplementation of infant formula affects growth and nutritional status in rhesus monkeys[1-3]," *Am J. Clin Nutr* (2003) 77:1261-1268.

Kuczmarski RJ, Ogden, CL, Grummer-Strawn, LM, et al. CDC growth charts: United States. Advance data from vital and health statistics; No. 314. Hyattsville, Maryland: National Center for Health Statistics, 2000.

Kurugol Z, Coker M, Coker C, Egemen A, Eroz B., "Comparison of growth, serum prealbumin, IgG and amino acids of term infants fed breast milk or formula," *Turk J Pediatr* 1997;39:195-202.

Lien, EL, Davis, AM, and multi-center group, "Growth and safety of a reduced protein formula enriched with bovine alpha-lactalbumin in term infants," *JPGN* 2004;38:170-176.

Lein et al., "A multicenter study of growth, acceptability and protein status of a lower protein term infant formula with increased bovine alpha-lactalbumin," *J. Pediatr. Gastroenerol Nutr* (2002) 34:A479.

LePage N, McDonald N, Dallaire L, Lambert M., "Age-specific distribution of plasma amino acid concentrations in a healthy pediatric population," *Clin Chem* 1997;43:2397-2402.

Lloyd B, Halter RJ, Kuchan MJ, Bags GE, Ryan AA, Masor ML, "Formula tolerance in post-breastfed and exclusively formula-fed infants," *Pediatrics* 1999;103:E7.

Matsumoto et al., "New biological function of bovine alpha-lactalbumin: protective effect against ethanol- and stress-induced gastric mucosal injury in rats," *Biosci Biotechnol Biochem* (2001) 65:1104-1111.

Millward DJ, "Metabolic demands for amino acids and the human dietary requirement," *J Nutr* 1998;128:2563S-2576S.

Peerson JM, Heing JM, Nommsen LA, et al., "Use of growth models to describe patterns of length, weight, and head circumference among breast-fed and formula-fed infants: The Darling Study," *Human Biology* 1993;4:611-26.

Pellegrini et al., "Isolation and identification of three bactericidal domains in the bovine alpha-lactalbumin molecule," *Biochim Biophys Acta* (1999) 1426(3):439-448.

Raiha NCR, Fazzolari-Nesci A, Cajozzo C, Pucci G, Monestier A, Moro G, et al., "Whey predominant, whey modified infant formula with protein/energy ratio of 1.8 g/100 kcal: adequate and safe for term infants from birth to four months," *JPGN* 2002;35:275-281.

Raiha NCR and Axelsson IE, "Protein intake during infancy," *Scand J Nutr* 1996;40:151-155.

Rudloff, S. and C. Kunz, "Protein and nonprotein nitrogen components in human milk, bovine milk, and infant formula: quantitative and qualitative aspects in infant nutrition", *J Pediatr Gastroenterol Nutr* 24(3): 328-44 (1997).

Sarwar G, Darling P, Ujie M, Botting HG, Pencharz PB, "Use of amino acid profiles of preterm and term human milks in evaluating scoring patterns for routine protein quality assessment of infant formulas," *J AOAC International* 1996;79:498-502.

Timmer et al. "Whey Protein Concentrates with Non-Traditional Compositions," *European Dairy Magazine* (1997) 189(8):47-49.

Ushida et al., "Effects of bovine alpha-lactalbumin on gastric defense mechanisms in naive rats," *Biosci Biotechnol Biochem* (2003) 67(3):577-583.

Victora CG, Morris SS, Barros FC, et al., "The NCHS reference and the growth of breast- and bottle-fed infants," *J Nutr* 1998;128:1134-8.

Wu Pyk, Edwards N, Storm MC, "Plasma amino acid pattern in normal term breast-fed infants," *J Pediatr* 1986;109:347-349.

Yogman et al, "Dietal Sleep Patterns In Newborn Infants," *New England Journal of Medicine*, 309(19)1147-9 (1983).

Zemel BS, Riley EM, Stallings VA, "Evaluation of methodology for nutritional assessment in children," *Annu Rev Nutr* 1997;17:211-235.

Zetterstrom R, Ginsberg BE, Lirtbald BS, Persson B., "Relation between protein intake, plasma valine, and insulin secretion during early infancy," *Klin Padiat* 1985;197:371-374.

McClellan R and Novak D., "Fetal nutrition: how we become what we are," *JPGN* 2001;33:233-244.

Vartderhoof J, et al., "Evaluation of a long-chain polyunsaturated fatty acid supplemented formula on growth, tolerance, and plasma lipids in preterm infants up to 48 weeks postconceptional age," *J Pediatr Gastoenterol Nutr* (1999) 29:318-26.

Weisbrod M, et al., "Feeding tolerance of ready-to-use versus powdered formulas in neonates," *Isr Med Assoc J.* (2000) 2:760-1.

Griffin MP, et al., "Can the elimination of lactose from formula improve feeding tolerance in premature infants?" *J Pediatr* (1999) 135:587-92.

Lucas A, et al. Efficacy and safety of long-chain polyunsaturated fatty acid supplementation of infant formula milk: a randomized trial. Lancet 1999;354:1948-54.

Gil-Alberdi B, et al. The evaluation of gastrointestinal tolerance for a new infant feeding formula (Similac) in health infants. Nutr Hosp 2000;15:21-31.

Heubi J, et al. Randomized multicenter trial documenting the efficacy and safety of a lactose-free and lactose-containing formula for term infants. J Am Diet Assoc. 2000;100:212-17.

Hendricks KM, Walker WA, editors. Manual o f pediatric nutrition, $2^{nd}$ Ed. Toronto: B.C. Decker, Inc. 1990.

Chatterton et al., α Lactalbumin-A Protein Ingredient for Use in Infant Nutrition, Werne H. (Ed.) Proceedings of the $25^{th}$ International Dairy Congress, Part II Dairy Science and Technology, The Danish National Committee of IDF 1999, pp. 402-409.

Kaneko et al., Selective Concentration of Bovine Immunoglobulins and α-Lactalbumin from Acid Whey using FeCl3, Journal of Food Science, vol. 50 (1985), pp. 1531-1536.

* cited by examiner

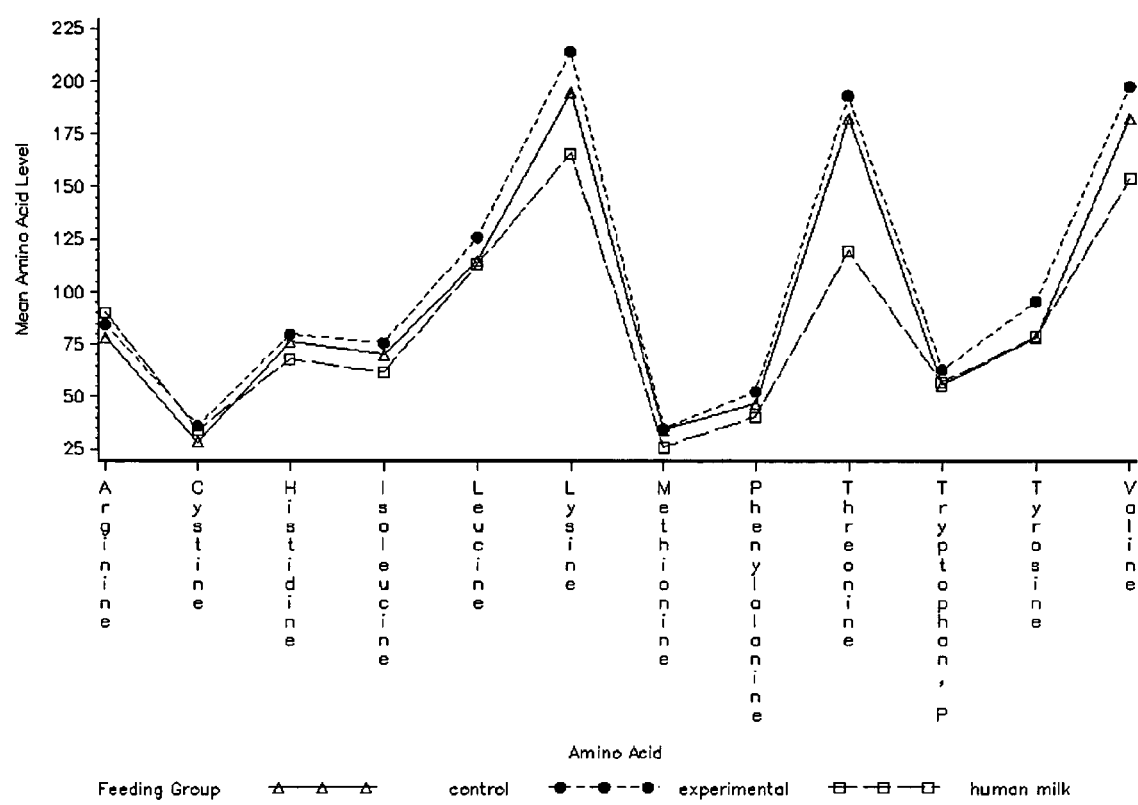
Figure 1. Aminogram of the Mean Plasma Essential Amino Acids at Week-8

Figure 2. Aminogram of Percent Difference of the Mean Plasma Essential Amino Acids
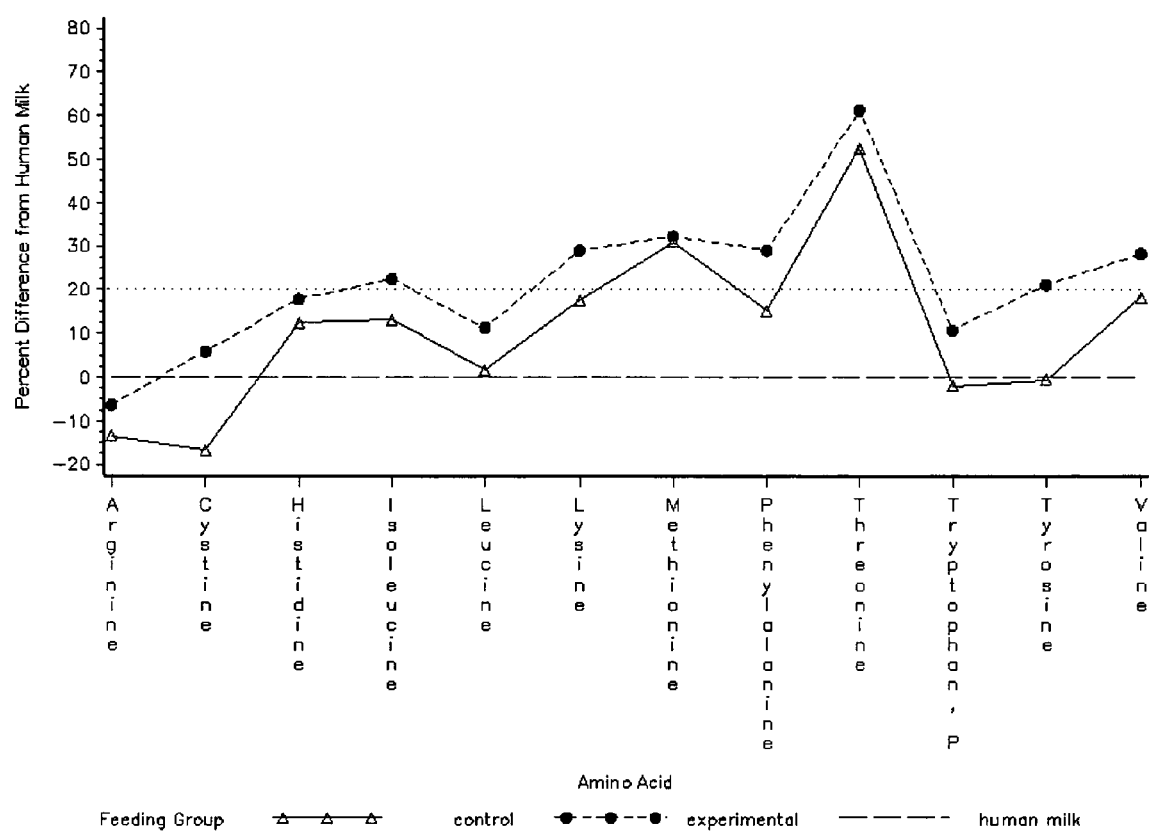

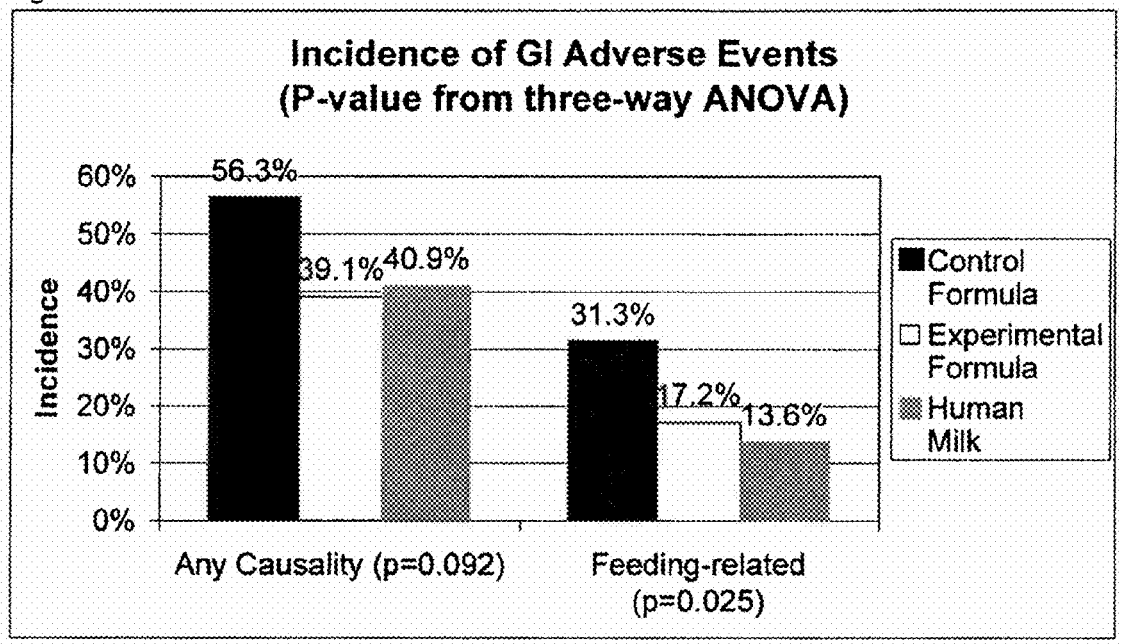
Figure 3. Incidence of Gastrointestinal Adverse Events

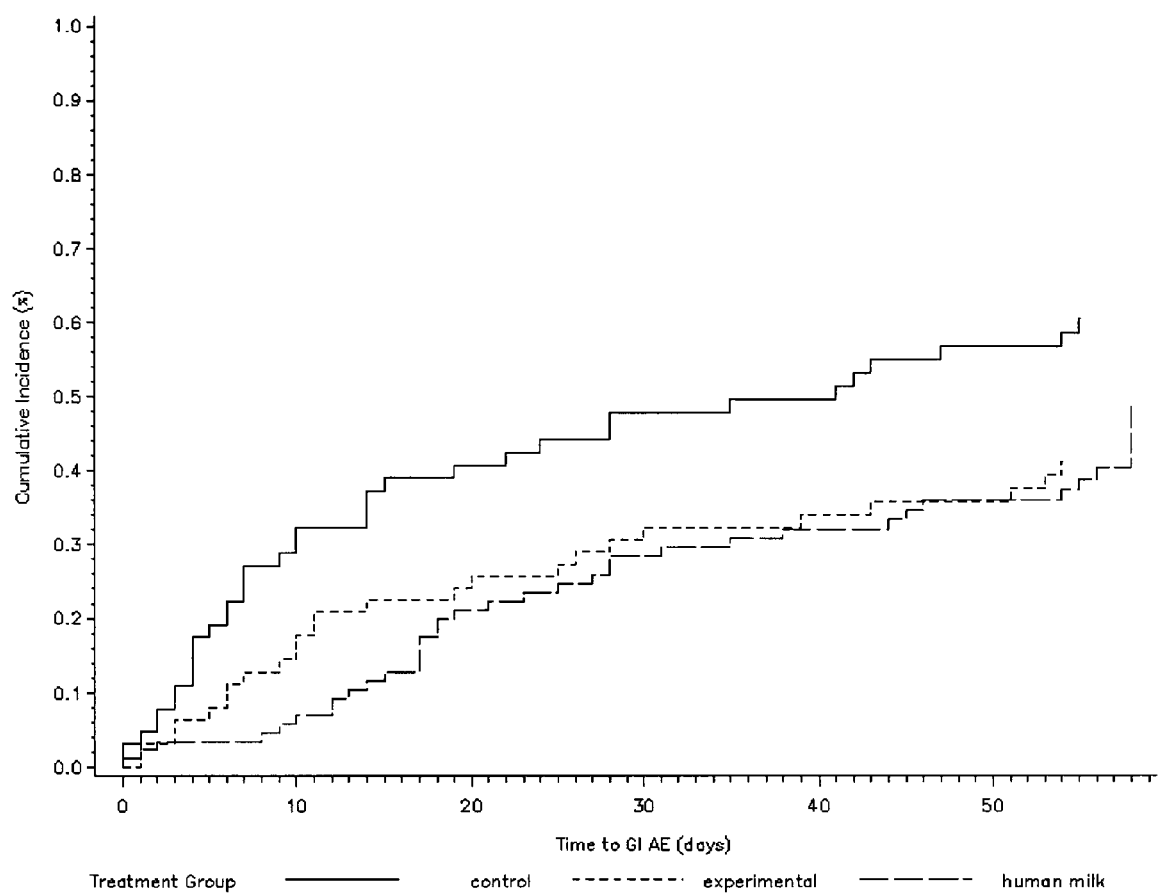
Figure 4. Cumulative Incidence of Gastrointestinal AEs

Figure 5. Study Withdrawals Due to Gastrointestinal Adverse Events
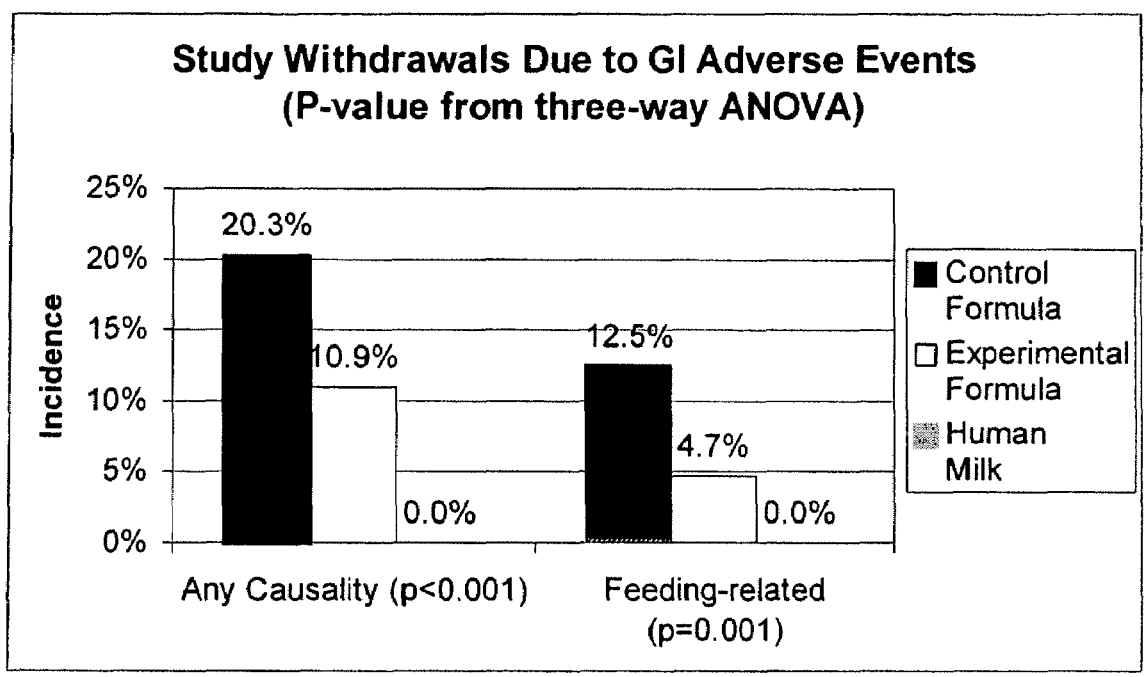

METHODS FOR REDUCING ADVERSE EFFECTS OF FEEDING FORMULA TO INFANTS

CROSS-REFERENCE TO RELATED APPLICATIONS

This application claims priority from U.S. application Ser. No. 10/318,977, filed on Dec. 13, 2002, now U.S. Pat. No. 6,913,778 which claims priority from U.S. provisional application Ser. No. 60/343,253, filed on Dec. 21, 2001. The entire disclosures of each are hereby incorporated by reference.

FIELD OF THE INVENTION

This invention is directed to infant formula compositions which demonstrate improved tolerance by infants with reduced adverse effects.

BACKGROUND OF THE INVENTION

Human milk is the preferred means for feeding the newborn human infant for the first four to six months of life. Infant formulas have been developed to replace or to supplement human milk when breast-feeding is inadequate, unsuccessful, or when a mother chooses not to breast feed. Attempts of improving infant formula composition have focused on more closely simulating the composition of breast milk.

Bovine milk has been used in infant formulas for over eighty years. However, the protein systems of human milk and cow's milk differ substantially, both quantitatively and qualitatively. Prominent quantitative differences include a lower total protein content of human milk (11 g/L) compared to cow's milk (33 g/L) and a difference in the ratio of whey proteins to caseins, which is 18:82 in bovine milk and 60:40 in human milk.

Attention in this area has focused on the notable qualitative differences between bovine milk and human milk, in their amounts of individual whey proteins, specifically alpha-lactalbumin and beta-lactoglobulin. Alpha-lactalbumin, a protein found in the milk of all mammals, is a major protein in human milk. Beta-lactoglobulin is absent from human milk. The protein content of bovine whey contains about 50% to 55% of beta-lactoglobulin and about 18% of alpha-lactalbumin. The ratio of beta-lactoglobulin to alpha-lactalbumin in bovine whey ranges between 2.5:1 and 4:1. Furthermore, it is known that the elimination or removal of beta-lactoglobulin in bovine milk increases the total amount of alpha-lactalbumin from 18% to 40% of bovine whey proteins, de Wit, J. N., "Nutritional and Functional Characteristics of Whey Proteins in Food Products", Journal of Dairy Science 81: 597-608 (1998).

Beta-lactoglobulin is particularly rich in the essential amino acids valine and threonine. Alpha-Lactalbumin is particularly rich in the essential amino acids tryptophan, lysine and cystine compared to other bovine milk proteins, Jarvenpaa, A. L., N. C. Raiha, et al., "Milk protein quantity and quality in the term infant. I. Metabolic responses and effects on growth", Pediatrics 70(2): 214-20 (1982). As a consequence of the differing amounts of the specific whey proteins in bovine milk and human milk and the amino acid compositions of these proteins, bovine milk and human milk differ substantially in their amino acid profiles, Rudloff, S. and C. Kunz, "Protein and nonprotein nitrogen components in human milk, bovine milk, and infant formula: quantitative and qualitative aspects in infant nutrition", J Pediatr Gastroenterol Nutr 24(3): 328-44 (1997). This difference remains in infant formulas made with bovine whey in which the composition of the specific whey protein is not modified.

As noted above, the elimination or reduction of beta-lactoglobulin in cow's milk-based infant formula increases the content of alpha-lactalbumin. Such a change would subsequently increase the levels of the essential amino acids cystine, tryptophan, tyrosine and phenylalanine and reduce the level of the essential amino acid threonine to levels that more closely resemble those in human milk. Therefore, an improved amino acid composition would permit a reduction in the total protein content of an infant formula.

DeWit, de Wit, J. N., "Nutritional and Functional Characteristics of Whey Proteins in Food Products", Journal of Dairy Science 81: 597-608 (1998), describe research activities focused on the fine-tuning of both milk protein and amino acid composition and specifically on enriching bovine milk with alpha-lactalbumin, beta-casein and lactoferrin to achieve the optimal nutritional composition, particularly with respect to the amino acid composition thereof. A nutritional composition is proposed which comprises beta-lactoglobulin-depleted whey proteins, beta-casein and lactoferrin in desalted bovine milk permeate. It is postulated that such a preparation will have a protein composition more closely approaching that of human milk than existing infant formulas.

Dairy technology has focused on whey protein fractionation processes to selectively remove substantially all the beta-lactoglobulin from whey or to isolate enriched alpha-lactalbumin fractions substantially free of beta-lactoglobulin, for use in foods, including infant formula. U.S. Pat. No. 5,455,331 describes a process using undefatted ultrafiltered whey to produce a material with a high alpha-lactalbumin content and, on a total precipitable protein basis, less than 5% of beta-lactoglobulin. The process involves heat precipitation of alpha-lactalbumin in undefatted ultrafiltered cheese whey at a pH of 4.2. The alpha-lactalbumin-rich precipitate is clarified, washed, neutralized, ultrafiltered and spray dried to yield a whey fraction, the protein therein being predominantly alpha-lactalbumin, substantially depleted of beta-lactoglobulin and including the lipid-containing components in the whey.

U.S. Pat. No. 5,420,249 discloses the use of defatted whey and calcium-binding resin to prepare whey for separation and a preferred alpha-lactalbumin fraction comprising at least 60% of the protein as alpha-lactalbumin and at most 10% of the protein as beta-lactoglobulin. They describe an alpha-lactalbumin-enriched fraction containing 13% of the protein as beta-lactoglobulin. However, this fraction contained 74% of the protein as alpha-lactalbumin, with a beta-lactoglobulin to alpha-lactalbumin ratio of 1:6. Other alpha-lactalbumin-enriched fractions had beta-lactoglobulin to alpha-lactalbumin ratios of 1:4 to 1:7.

U.S. Pat. No. 5,436,020 describes an infant formula devoid of untreated cows' milk protein which is made with a material consisting of delactosed and deionized whey permeate as a source of non-protein nitrogen combined with a fractionated whey ultrafiltered to remove casein glycomacropeptides and fat. U.S. Pat. No. 5,169,666 describes treating bovine milk to eliminate or substantially reduce the alpha-s-casein and to reduce the beta-lactoglobulin level to 4% or less as a percentage of the protein, in order to make a 'humanized' bovine milk material for infant feeding.

BRIEF DESCRIPTION OF THE DRAWINGS

FIG. 1 depicts an aminogram of the Mean Plasma Essential Amino Acids at Week 8.

FIG. 2 depicts an aminogram of Percent Difference of the Mean Plasma Essential Amino Acids.

FIG. 3 depicts the incidence of Gastrointestinal Adverse Events.

FIG. 4 depicts the cumulative incidence of Gastrointestinal AEs.

FIG. 5 depicts study withdrawals Due to Gastrointestinal Adverse Events.

SUMMARY OF THE INVENTION

The present invention is directed to methods for reducing side effects of feeding an individual an infant formula, the method comprising feeding to an infant a formula composition of the invention which is well-tolerated by infants. The infant formula composition of the present invention comprises a whey fraction wherein 40% or less of the total protein in the whey fraction is alpha-lactalbumin and more than 8% of the total protein in the whey fraction is beta-lactoglobulin, with the proviso that the percentage of alpha-lactalbumin is greater than the percentage of beta-lactoglobulin in the whey fraction.

In some aspects the present invention is directed to methods for reducing side-effects of feeding in a subject comprising administering to said subject a composition comprising an amount of bovine milk providing 1.0 to 1.2 grams of protein per 100 available kilocalories and an amount of a bovine whey material providing 1.0 to 1.2 grams of protein per 100 available kilocalories, said bovine whey material having an alpha-lactalbumin content of 28% to 40% and a beta-lactoglobulin content of 8% to 33% of total protein.

DETAILED DESCRIPTION OF THE INVENTION

The present invention is further directed to a method for reducing side-effects of feeding an individual an infant formula. The methods comprise administering to the individual a composition comprising an amount of bovine milk providing 1.0 to 1.2 grams of protein per 100 available kilocalories and an amount of a bovine whey material providing 1.0 to 1.2 grams of protein per 100 available kilocalories, said bovine whey material having an alpha-lactalbumin content of 28% to 40% and a beta-lactoglobulin content of 8% to 33% of total protein. In some embodiments the whey material has an alpha-lactalbumin content between about 28% to about 36% and a beta-lactoglobulin content of between about 10% to about 29% of total protein. In the present formulas, the percentage of alpha-lactalbumin in the whey fraction is greater than the percentage of beta-lactoglobulin in the whey fraction. In some embodiments the beta-lactoglobulin content in the whey fraction is not greater than the percentage of the alpha-lactalbumin in the whey fraction minus 7%.

In some embodiments, the modified whey with specific amounts of alpha-lactalbumin and beta-lactoglobulin composition of the present invention has a non-protein nitrogen content of about 15% or less of total nitrogen; a total protein content of between about 12.5 to about 95%; a fat content of about 15% or less; and an ash content of about 4.5% or less, all percentages on a w/w basis. In some embodiments, the total protein content of the modified whey is between about 35% to about 80% and more preferably about 73% to about 77%.

The bovine whey material utilized in the compositions of the present invention has a minimum amino acid content, in grams per 100 grams of total protein, as follows: arginine 3.1; cystine 1.4; histidine 1.6; isoleucine 1.0; leucine 5.3; lysine 3.9; methionine 0.3; phenylalanine 1.2; threonine 3.2; tryptophan 1.5; tyrosine 0.9; and valine 1.0. Accordingly, it is not necessary that the infant formula of the present invention contain added amino acids.

The present infant formula may be additionally formulated with other nutritionally beneficial ingredients known in the art, e.g., oils providing longer chain polyunsaturated fatty acids, such as arachidonic acid and docosahexaenoic acid. The present infant formula may further be formulated with vitamins, minerals, selenium, natural carotenoids, nucleotides, taurine and other nutrients.

Thus, in one embodiment, the present invention is directed to methods for reducing side effects of feeding an individual an infant formula, the methods comprising feeding to an infant a formula composition of the invention which is well-tolerated by infants. In some embodiments the formula comprises an amount of bovine milk providing 1.0 to 1.2 grams of protein per 100 available kilocalories and an amount of a bovine whey material providing 1.0 to 1.2 grams of protein per 100 available kilocalories, said bovine whey material having an alpha-lactalbumin content of 28% to 40% and a beta-lactoglobulin content of 8% to 33% of total protein. In some embodiments the infant formula composition comprises 2.0-2.4 grams of protein per 100 available kilocalories, wherein the protein is comprised of substantially equal amounts of protein from unmodified bovine milk and from a whey fraction, said whey fraction being enriched with respect to alpha-lactalbumin.

In some embodiments the administration of the infant formula compositions of the present invention reduces or eliminates side-effects. In some embodiments the side-effects are gastric side-effects. Gastric side effects are well-known to the art skilled and include, without limitation, eructation, constipation, gastroesophogeal reflux disease, flatulence, abdominal pain, vomiting, diarrhea and regurgitation.

In some embodiments side-effects in the individual are reduced by at least 20%, 30%, 40%, 50%, 75% 90%, 99% or 100% in the subject as compared to a control subject. Those skilled in the art are credited with the ability to detect and measure the presence and levels of side-effects in an individual as well as quantifying reduction in side-effects through the use of the claimed methods.

In some embodiments, the methods include administering an amount of one or more traditional infant formulas to the individual in combination with the composition of the present invention. In some embodiments, the individual is administered an amount of infant formula (Y) wherein 1-98% of Y is traditional infant formula, for example, 98%, 95%, 90%, 80%, 75%, 70%, 60%, 50%, 40%, 30%, 25%, 20%, 10% or 5% of Y is traditional infant formula, with the balance made up with the composition of the present invention. The traditional infant formula may be administered simultaneously with, before, or after administration of the composition of the present invention. In some embodiments, the composition of the present invention is admixed with the one or more traditional infant formulas and administered simultaneously to the individual. It is believed that administration of the composition of the present invention will reduce the side-effects in the individual caused by administration of the traditional infant formula(s).

In some embodiments the control subject is a subject administered an equivalent amount of a control formula. In some embodiments, the control subject is similar in one or more of age, weight, length, developmental state, head circumference, etc. In some embodiments the control formula is a traditional infant formula. As used herein the term "traditional infant formula" refers to infant formulas other than the composition described herein, said composition comprising an amount of bovine milk providing 1.0 to 1.2 grams of protein per 100 available kilocalories and an amount of a bovine whey material providing 1.0 to 1.2 grams of protein per 100 available kilocalories, said bovine whey material having an alpha-lactalbumin content of 28% to 40% and a beta-lactoglobulin content of 8% to 33% of total protein. In some embodiments the traditional infant formula is commercially available.

An "equivalent amount" refers to a quantity of infant formula providing levels of ingredients equivalent to those provided by the infant formula compositions of the present invention. In some embodiments, an equivalent amount refers to the amino acid concentrations provided. In some embodiments, an equivalent amount refers to the amount of total protein per available kilocalories provided. In some embodiments, an equivalent amount refers to the amount of grams of protein per 100 available kilocalories provided by bovine milk. In some embodiments, an equivalent amount refers to the amount of grams of protein per 100 available kilocalories provided by whey material As used herein the term "about" refers to an amount within 10%, 5%, 2% or 1% of a given value.

As used herein the term "dominant" refers to the most abundant protein species present in a mixture of a plurality of proteins.

The present infant formula may be prepared by blending appropriate quantities of an alpha-lactalbumin-enriched whey protein concentrate with skimmed milk, lactose, vegetable oils and fat soluble vitamins in deionized water. Preferably, these materials are blended together in quantities sufficient to provide a final concentration of approximately 240 grams/liter. Mineral salts may then be added to the mixture prior to a high temperature/short time pasteurization step. Appropriate mineral salts include calcium chloride, calcium carbonate, sodium citrate, potassium hydroxide, potassium bicarbonate, magnesium chloride, ferrous sulfate, potassium citrate, zinc sulfate, calcium hydroxide, copper sulfate, magnesium sulfate, potassium iodide, sodium selenite, etc. The mixture is then homogenized and cooled. Heat-labile vitamins and micronutrients may then be added to the mixture. The mixture is then standardized with deionized water to a final total solids concentration of about 120 to about 135 and preferably about 123 grams per litre, which is equivalent to about 670 kcal per litre. The formula may be sterilized using a conventional ultra-high temperature or standard retort process. This sterilized material is then placed in appropriate packaging.

Other known methods of manufacture and sterilization can be used for the preparation of the present infant formula. The present infant formula may also be produced as a concentrated liquid product requiring dilution with an equal volume of water prior to feeding to an infant. Furthermore such an infant formula may be dehydrated, such as in a spray dryer, to create a stable infant formula powder that offers advantages of stability and economy of transport, said powder requiring reconstitution with water prior to feeding to an infant.

The infant formula of the present invention is advantageous in that it has an amino acid profile composition that does not require addition of added essential amino acids to meet or exceed European Union [Directive 91/321/EEC] standards for amino acids in infant formula. Said amino acid profile permits a reduction in total protein concentration to 2.1 grams per 100 available kilocalories, which is closer to the total protein concentration in human milk. Another advantage is an infant formula that exceeds the protein requirements of the U.S. Infant Formula Act. A further advantage is an infant formula that contains the average amount of alpha-lactalbumin as found in human milk. Yet a further advantage is an infant formula that contains alpha-lactalbumin as the major whey protein. Yet another advantage is an infant formula that contains long chain omega-3 and omega-6 polyunsaturated fatty acids at nutritionally desirable levels.

Bovine milk is the basis for most infant formulas. Despite a total protein concentration three times as high as that of human milk, bovine milk contains less than half as much alpha-lactalbumin as human milk. Human milk does not contain any beta-lactoglobulin. In contrast, beta-lactoglobulin is the most abundant whey protein in bovine milk (Table 1).

Most current infant formulas made with unmodified bovine milk as the only protein source contain about 15-16 g/L of protein, are casein-predominant and contain only 0.5 g/L of alpha-lactalbumin (Table 1). Current infant formulas made with whey protein unmodified with respect to protein composition contain 15 g/L of protein. Demineralized whey supplies half of the protein in these infant formulas. These infant formulas contain 1.2 g/L of alpha-lactalbumin, approximately half as much as in an equal volume of human milk (Table 1).

TABLE 1

| Protein, g/L (N * 6.38) | Human Milk | Bovine Milk | Standard Milk-based Infant Formula | Standard Current whey based Infant Formula |
|---|---|---|---|---|
| Total "protein" | 11 | 33-35 | 15-16 | 15 |
| Whey protein | 6.0 | 6.3-7.0 | 2.9-3.2 | 9.0 |
| alpha-lactalbumin | 2.3 | 1.1 | 0.5 | 1.2 |
| beta-lactoglobulin | none | 3.1 | 1.4-1.6 | 4.2 |

EXAMPLE 1

A whey protein concentrate enriched with respect to alpha-lactalbumin but containing a significant level of beta-lactoglobulin was prepared for use in the present infant formulas. The concentrate had the following proximate and mineral composition and whey protein proportions.

TABLE 2

| Analyte | unit | |
|---|---|---|
| Fat | % | 14.1 |
| Moisture | % | 4.2 |
| Protein | % | 73.7 |
| Ash | % | 3.44 |
| α-lactalbumin | % | 31.6 |
| β-lactoglobulin | % | 16.1 |
| α/β | | 1.96 |
| Phosphorous | mg % | 372 |
| Magnesium | mg % | 5.90 |
| Calcium | mg % | 40.5 |
| Sodium | mg % | 138 |
| Potassium | g % | 1.7 |
| Chloride | mg % | 352 |

The proportions of alpha-lactalbumin and beta-lactoglobulin in the whey protein fraction was measured after 2-Mercaptoethanol reduction using a GPC (gel permeation chromatography) method with 6M Guanidine HCL as the mobile phase and the solvent.

The chromatography column was packed with Progel TSK G3000 SW XL. Two columns were arranged in series with a guard column of SW XL. The mobile phase was prepared by dissolving 573.18 g Guanidine HCl in 600 mL of HPLC grade water. Buffer stock, 100 mL, was added and the solution was heated and stirred to achieve complete dissolution. The pH was adjusted to pH 7.5 with 50% sodium hydroxide. After filtering, the solution was diluted to 1 liter. The buffer stock was prepared by dissolving 56.6 g $Na_2HPO_4$, 3.5 g $NaH_2PO_4$ and 2.9 g ethylene diamine tetraacetic acid in 1000 mL of HPLC grade water and adjusting to pH 7.5 with hydrochloric acid.

The chromatography conditions included the following: Flow Rate, 0.5 mL/min; Run Time, 60 min; Injection Volume, 50 microliters; Temperature, Ambient; and Detector, UV 280 nm.

Samples were prepared by weighing an amount equivalent to 10 mg of protein into a 10 mL volumetric flask. The mobile phase was added to volume and the flask was mixed well. The solution was sonicated for 20 minutes. About one milliliter of the solution is transferred to an injection vial, 10 microliters of 2-Mercaptoethanol are added and the solution is mixed on a vortex mixer for 10 seconds. The sample was then injected into the HPLC system.

Standards were prepared by weighing about 25 mg of bovine alpha-Lactalbumin and beta-Lactoglobulin separately, and dissolving them with HPLC grade water in a 10 mL volumetric flask. Calibration standard were prepared by pipetting 1.0 mL of each standard into a 10 mL volumetric flask and diluting to volume with the mobile phase. About-one milliliter of each calibration standard solution was transferred to an injection vial, 10 microliters of 2-Mercaptoethanol were added and the solution was mixed with a vortex mixer for 10 seconds. The standard sample was then injected into the HPLC system.

EXAMPLE 2

The whey protein concentrate of Example 1 was mixed with an amount of skim milk containing an equal amount of protein to provide a ratio of whey proteins to caseins of 60:40. Alpha-lactalbumin was found to be the dominant whey protein in this protein mixture.

This protein mixture was used to prepare an improved infant formula with a protein content lower than that in standard whey-based infant formula and closer to that found in human milk. The protein content, whey protein content, alpha-lactalbumin level and beta-lactoglobulin level of said infant formula are shown in Table 3. The amount of alpha-lactalbumin in said infant formula was greater than the amount of beta-lactoglobulin. The amount of alpha-lactalbumin in said infant formula was essentially equal to the amount of alpha-lactalbumin in human milk.

TABLE 3

| Protein, g/L (N * 6.38) | Human milk | Milk-based Infant formula | Standard Current whey based Infant Formulas | Standard Infant Formula of the Invention |
|---|---|---|---|---|
| Total "protein" | 11 | 15-16 | 15 | 14 |
| Whey protein | 6.0 | 2.9-3.2 | 9.0 | 8.4 |
| α-lactalbumin | 2.3 | 0.5 | 1.2 | 2.2-2.5 |
| β-lactoglobulin | none | 1.4-1.6 | 4.2 | 1.3-2.1 |

Four batches of ready-to-feed liquid infant formulas incorporating this protein mixture were manufactured in 4000-liter quantities in the following manner.

A fat blend for each batch was prepared by combining 43.54 kg of randomized palm olein, 35.2 L of a high-oleic sunflower oil or safflower oil, 34.6 L of coconut oil, 28.1 L of soybean oil, 1.36 kg of soy lecithin, 1.37 kg of distilled monoglycerides, 1.19 kg of an oil containing 38% of its fatty acids as arachidonic acid (ARASCO, Martek, Columbia, Md.) and 0.74 kg of an oil containing 38% of its fatty acids as docosahexaenoic acid (DHASCO, Martek, Columbia, Md.).

The fat-soluble vitamins vitamin A (vitamin A palmitate and natural mixed carotenoids), vitamin D (cholecalciferol), vitamin E (dl-alpha-tocopherol acetate) and vitamin K (phytonadione) were then dispersed in the fat blend.

To produce a batch of the improved formula, an amount of heated liquid skim milk or powdered skim milk sufficient to provide 28 kg of protein was added to warm deionized water in a compounding tank to which had been added 723 g of sodium citrate and 404 g potassium bicarbonate dissolved in hot water. The fat blend was metered into the compounding tank. The major dry ingredients, lactose and the whey protein concentrate were added through a powder funnel eductor. The amount of added whey protein concentrate varied according to its protein content and was sufficient to provide 28 kg of protein. Taurine, 221 g was dissolved in hot water and added to the compounding tank. The following minerals were dissolved or dispersed separately in hot water and added to the compounding tank with intensive agitation: calcium carbonate, 679 g; calcium hydroxide, 262 g; potassium hydroxide, 143 g; magnesium chloride, 507 g; calcium chloride, 292 g; potassium chloride, 552 g; ferrous sulfate, 151 g; potassium iodide, 31.6 g of a 1% triturate in lactose; 250 g of a 44.6% solution of zinc sulfate; 367 g of a 2.5% solution of copper sulfate; 5.08 g of a 2.5% solution of manganese sulfate, and 12.5 g of a 0.3% sodium selenite triturate in potassium bicarbonate.

The mixture was heated to 96+/−2° C., held for 30 seconds and then cooled to 66+/−2° C. The mixture was then homogenized in a two-stage homogenizer, at 2500 psig in the first stage and 500 psig in the second stage. The homogenized mixture was then cooled to 5-10° C. using a plate heat exchanger.

A sample of the mixture was analyzed for fat, pH and total solids. An appropriate amount of deionized water was added as required to achieve 80% of total dilution and the batch was mixed. A sample was taken for analysis of total solids and pH. The quantity of water required for final dilution was calculated. A portion of this dilution water was used to dilute the nucleotides and water-soluble vitamins before their addition to the mix. The following nucleotides were dissolved in warm water and added to the mix: cytidine 5' monophosphate, 63.7 g; adenosine 5' monophosphate, 18.6 g; uridine 5' monophosphate, disodium salt, 32.4 g; inosine 5' monophosphate, disodium salt, 13.0 g; and guanosine 540 monophosphate, disodium salt, 11.2 g.

An appropriately formulated water-soluble vitamin premix was dissolved in warm water and this solution was added to the mix. Choline chloride, 251 g, and myo-inositol, 104 g, were dissolved in water and added to the mix. Ascorbic acid, 812 g, was dissolved in warm water and 462 g of potassium bicarbonate were added slowly to neutralize the ascorbic acid. The neutral ascorbate solution was then added to the mix. The mix was agitated for 30 minutes. The mix was standardized to total solids of about 123 g per litre.

Twenty hours after the initial homogenization, the mix was homogenized again and sterilized through a Stork UHT (ultra high temperature) aseptic processing system and aseptically filled into 250-mL flexible containers.

Control Formula

Control batches of ready-to-feed liquid infant formulas made with demineralized whey (typically 13.5% protein, 85% lactose, fat 1%, and an ash content of less than 1.5%)

were manufactured in 4000-liter quantities in the following manner. An amount of heated liquid skim milk sufficient to provide 30 kg of protein was added to warm deionized water in a compounding tank to which had been added sodium citrate and potassium citrate dissolved in hot water. The fat-soluble vitamin-enriched fat blend was metered into the compounding tank. The major dry ingredients, lactose and the demineralized whey, were added through a powder funnel eductor. The amount of added demineralized whey varied according to its protein content and was sufficient to provide 30 kg of protein. Taurine was dissolved in hot water and added to the compounding tank. The following minerals were dissolved or dispersed separately in hot water, and combined and added to the compounding tank with intensive agitation: potassium bicarbonate, calcium chloride, potassium chloride, sodium chloride, calcium citrate, ferrous sulfate, potassium iodide, zinc sulfate, copper sulfate, manganese sulfate, and sodium selenite.

The control formula was heat treated, homogenized and supplemented with nucleotides and a water-soluble vitamin premix in the same manner as the formula of the present invention described above. The control formula mix was homogenized again and sterilized through a Stork UHT (ultra high temperature) aseptic processing system and filled into 250-mL flexible containers.

The major ingredients of the two formulas of this example are as follows:

TABLE 4

| Control Formula | Formula of the Present Invention |
| --- | --- |
| Electrodialyzed whey | Alpha-Lactalbumin enriched whey fraction |
| Vegetable oils (palm, soybean, coconut and high oleic sunflower or safflower) | Vegetable oils (palm, soybean, coconut and high oleic sunflower or safflower) |
| Skim milk | Skim milk |
| Lactose | Lactose |
| Emulsifiers (soy lecithin, monoglycerides) | Emulsifiers (soy lecithin, monoglycerides) |
| Long chain polyunsaturated oils | Long chain polyunsaturated oils |
| Taurine | Taurine |
| Cytidine-5'-monophosphate | Cytidine-5'-monophosphate |
| Disodium uridine-5'-monophosphate | Disodium uridine-5'-monophosphate |
| dl-Alpha-tocopherol acetate | dl-Alpha-tocopherol acetate |
| Adenosine-5'-monophosphate | Adenosine-5'-monophosphate |
| Disodium inosine-5'-monophosphate | Disodium inosine-5'-monophosphate |
| Disodium guanosine-5'-monophosphate | Disodium guanosine-5'-monophosphate |

The mineral ingredients in the two formulas were as follows:

TABLE 5

| Control Formula | Formula of the Present Invention |
| --- | --- |
| Calcium chloride | Sodium citrate |
| Potassium bicarbonate | Calcium carbonate |
| Sodium chloride | Potassium Hydroxide |
| Potassium hydroxide | Magnesium chloride |
| Ferrous sulfate | Calcium chloride |
| Potassium citrate | Potassium chloride |
| Zinc sulfate | Calcium hydroxide |
| Calcium citrate | Ferrous sulfate |
| Copper sulfate | Zinc sulfate |

TABLE 5-continued

| Control Formula | Formula of the Present Invention |
| --- | --- |
| Potassium chloride | Potassium iodide |
| Manganese sulfate | Copper sulfate |
| Potassium iodide | Manganese sulfate |
| Sodium selenite | Sodium selenite |

The vitamin ingredients in the two formulas were as follows:

TABLE 6

| Control Formula | Formula of the Present Invention |
| --- | --- |
| Vitamin C (ascorbic acid) | Vitamin C (ascorbic acid) |
| Vitamin E (dl-Alpha tocopherol acetate) | Choline chloride |
| Ascorbyl palmitate | Inositol |
| Niacin (nicotinamide) | Vitamin E (dl-Alpha tocopherol acetate) |
| Pantothenic acid | Niacin (nicotinamide) |
| Vitamin A palmitate | Ascorbyl palmitate |
| Thiamine hydrochloride | Pantothenic acid |
| Vitamin B-6 | Vitamin A palmitate |
| Riboflavin | Riboflavin |
| beta-carotene | Thiamine hydrochloride |
| Folic acid | Vitamin B-6 |
| Vitamin K (phytonadione) | Natural mixed carotenoids |
| Biotin | Folic acid |
| Vitamin D (cholecalciferol) | Vitamin K (phytonadione) |
| Vitamin B-12 | Biotin |
| | Vitamin D (cholecalciferol) |
| | Vitamin B-12 |

The nutrient compositions of some of the embodiments of the present infant formula and the Control Formula are set forth in Table 7.

TABLE 7

| Nutrient (units/L) | Formula of the Present Invention | Control Formula |
| --- | --- | --- |
| Energy (kcal) | 672 | 672 |
| Protein (g) | 14 | 15 |
| Carbohydrate (g) | 73 | 72 |
| Fat (g) | 36 | 36 |
| Vitamin A (IU) | 2200 | 2200 |
| Beta-carotene (IU) | 400 | 400 |
| Vitamin D (IU) | 425 | 425 |
| Vitamin B (IU) | 11 | 11 |
| Vitamin K (µg) | 67 | 67 |
| Vitamin $B_1$ (µg) | 1000 | 1000 |
| Vitamin $B_2$ (µg) | 1500 | 1500 |
| Vitamin $B_6$ (µg) | 600 | 600 |
| Vitamin $B_{12}$ (µg) | 2 | 2 |
| Niacin (µg) | 5000 | 5000 |
| Folic Acid (µg) | 80 | 80 |
| Pantothenic Acid (µg) | 3000 | 3000 |
| Biotin (µg) | 20 | 20 |
| Vitamin C (mg) | 90 | 90 |
| Choline (mg) | 100 | 100 |
| Inositol (mg) | 45 | 45 |
| Taurine (mg) | 47 | 47 |
| Calcium (mg) | 420 | 460 |
| Phosphorus (mg) | 240 | 333 |
| Magnesium (mg) | 45 | 64 |
| Iron (mg) | 8 | 8 |
| Zinc (mg) | 6 | 6 |
| Manganese (µg) | 50 | 50 |
| Copper (µg) | 560 | 333 |
| Iodine (µg) | 100 | 100 |
| Sodium (mg) | 160 | 160 |
| Potassium (mg) | 650 | 700 |
| Chloride (mg) | 433 | 433 |
| Selenium (µg) | 14 | 14 |

TABLE 7-continued

| Nutrient (units/L) | Formula of the Present Invention | Control Formula |
|---|---|---|
| Nucleotides | | |
| CMP (mg) | 16.5 | 16.5 |
| UMP (mg) | 5.0 | 5.0 |
| AMP (mg) | 4.0 | 4.0 |
| GMP (mg) | 2.0 | 2.0 |
| IMP (mg) | 2.0 | 2.0 |

The calcium and phosphorus levels in the present formula are closer than standard formulas to the levels found in human milk. Human milk contains an average of 254 mg/L of calcium and 139 mg/L of phosphorus.

EXAMPLE 3

Four individual batches of the infant formula according to the present invention were produced. Each batch was analyzed for amino acid composition by standard high performance liquid chromatography methods. The average levels of amino acids essential for the human infant in the protein in the improved formula are shown in Table 8. The present formula has an amino acid profile closer to that of human milk than standard whey formulas (Table 8). The protein source of the present formula is higher in tryptophan, lysine and cystine and is lower in threonine than standard whey-based formulas.

The European Union (EU) has provided a specific human milk amino composition to which formulas must be compared [Directive 91/321/EEC]. EU requires amino acid composition must be 100% of EU human milk values on a volume basis in mg/100 kcal. The factor used to convert mg/100 kcal to mg/L was 676 kcal/L.

TABLE 8

Essential amino acid composition on a mg/L basis for improved formula, human milk per European Union Annex V, and current whey-based formula.

| Amino Acid | European Union Annex V Human Milk | Infant Formula of the Present Invention | Standard whey based Infant Formula |
|---|---|---|---|
| Arginine | 466 | 490 | 560 |
| Cystine | 162 | 250 | 230 |
| Histidine | 304 | 360 | 380 |
| Isoleucine | 487 | 750 | 870 |
| Leucine | 1055 | 1430 | 1410 |
| Lysine | 825 | 1140 | 1130 |
| Methionine | 196 | 290 | 360 |
| Phenylalanine | 419 | 610 | 620 |
| Threonine | 541 | 710 | 810 |
| Tryptophan | 203 | 290 | 230 |
| Tyrosine | 399 | 590 | 540 |
| Valine | 541 | 840 | 870 |

The formula of the present invention contains a higher level of tryptophan, an essential aromatic amino acid, than does human milk or current whey-based infant formula. Infants fed current infant formula often have plasma amino acid levels that exceed the levels found in breast-fed infants with the exception of tryptophan. Plasma tryptophan levels of formula-fed infants often are significantly lower than those of breast-fed infants, Fazzolari-Nesci et al, "Tryptophan Fortification of Adapted Formula Increasing Plasma Tryptophan Concentrations to Levels Not Different from Those Found in Breast-Fed Infants," Journal of Ped. Gastro and Nut., 14:456-459 (1992). Tryptophan is the precursor to the neurotransmitter serotonin, Fernstrom et al, "Brain Serotonin Content: Physiological Regulation by Plasma Neutral Amino Acids," Science, 178: 414-415 (1972). Elevated serotonin levels are associated with improved sleep latency (quicker onset of sleep). Tryptophan supplementation of infants shortens the time to onset of sleep, Yogman et al, "Dietal Sleep Patterns In Newborn Infants," New England Journal of Medicine, 309 (19): 1147-9 (1983).

Tryptophan competes for the same transport system as large neutral amino acids (LNAA). Thus, if relatively high concentrations of LNAA are present, tryptophan is less efficiently transported across cells. In order to ensure optimal transport of tryptophan across the intestine and also into the brain, a relatively high tryptophan/LNAA ratio is desirable. Compared to current infant formula, the present formula possesses a better tryptophan/LNAA ratio, ie, closer to that of human milk.

Cystine is a component of glutathione, a tripeptide with important metabolic functions. Gluthathione is essential as an antioxidant and also in ensuring optimal immune function. The present formula contains elevated cystine levels compared to current whey- and casein-dominant formulas.

The amino acid composition of the present infant formula enables a reduction in the total protein level to a level closer to human milk while complying with EU amino acid requirements.

EXAMPLE 4

The improved formula and the control formula of Example 2 were evaluated in a prospective, multi-center, randomized, controlled, color-coded, parallel-group, outpatient study in healthy, term infants. Infants were randomized to receive one of the two formulas and were followed for 12 weeks.

Infants were healthy full-term infants with weights and lengths appropriate for gestational age. Weight-for-length ratios were between the $10^{th}$ and $90^{th}$ percentiles for age according to growth charts provided by the National Center for Health Statistics (NCHS).

At enrollment, infants were no more than 14 days of age. Weight and length were still between the $10^{th}$ and $90^{th}$ percentiles for age according to the NCHS growth charts. Infants were exclusively fed study infant formula.

Feeding of study formula began the day of the baseline visit. Of the 193 infants who entered the study, 98 infants received the infant formula of the present invention and 95 infants received the control formula. An infant could be withdrawn from the study for formula intolerance, for receiving non-study feedings for more than 5 consecutive days or more than 7 cumulative days, for receiving human milk, baby food, or other solid foods, or for noncompliance with the study protocol. The physician or the parent could withdraw an infant voluntarily at any time for any reason.

Of the 98 infants assigned to the experimental formula, 72 (73.5%) completed the study. Of the 95 infants assigned to the control formula, only 62 (65.3%) completed the study. Eight infants (8.2%) in the experimental group and four infants (4.2%) in the control group discontinued from the study because of protocol violations. Five infants in the experimental group and four infants in the control group discontinued because they failed to return. Of the remaining infants, 72, or 85%, of the experimental group and 62, or 71%, of the control formula group completed the study. More of the infants in the control group discontinued the study due to adverse events (20/95 or 21%) than did those infants in the improved formula group (15/98 or 15.3%).

TABLE 9

Infant Enrolment and Discontinuation

| Status | Experimental Formula (N = 98) | Control Formula (N = 95) | Total (N = 193) |
|---|---|---|---|
| Reason for discontinuation | N | N | N |
| Entered | 98 | 95 | 193 |
| Failed to return | 5 | 4 | 9 |
| Protocol violation | 8 | 4 | 12 |
| Relevant number | 85 (100%) | 87 (100%) | 172 (100%) |
| Completed | 72 (85%) | 62 (71%) | 134 (100%) |
| Discontinued for* | | | |
| Adverse event | 15 | 20 | 35 |
| Physician/family request | 19 | 23 | 42 |
| Other reasons | 2 | 3 | 5 |

*Multiple reasons for discontinuation were allowed in this study.

The primary efficacy measurements were infant weight (g), length (cm), and head circumference (cm), which were recorded at baseline and at Weeks 4, 8, and 12. Assessments were to be done up to three days before enrollment, and within ±3 days of the other time points.

Baseline values for age, length, and head circumference were similar between the two study groups. At baseline, mean ages were 10.1 days and 10.5 days, mean lengths were 51.5 cm and 51.3 cm, and mean head circumferences were 35.4 cm and 35.5 cm for the experimental and control groups, respectively. There was a statistically significant difference in weight between the two study groups at baseline (p=0.04). Infants in the experimental group were slightly heavier, on average, than infants in the control group (3536.4 g vs. 3458.5 g).

Both formulas were effective at promoting growth. Infants fed either study formula grew to a similar extent during the study. After baseline, there were no statistically significant differences between the formula groups on any of the growth measures (weight, length, or head circumference). The anthropometric data showed significant growth on all measures over a 12-week period, with the average infant gaining approximately 2700 g of body weight, 10 cm in body length, and 5 cm in head circumference. There was no statistically significant difference between the groups fed the experimental and control formulas at Weeks 4, 8, or 12. Z-scores for mean weight gain from baseline to week 12 were higher in the improved formula group (+0.49) as compared to the control group (+0.183). The improved formula group also had fewer non-study feedings than the control group (35.7% versus 42%, respectively).

Adverse events and acceptability and tolerance of study formula were recorded at visits at Weeks 4, 8, and 12 and by telephone contacts at Weeks 2, 6, and 10. Assessments were done within 3 days before or after the time point. Tolerance data were collected by interview. An adverse event was defined as any untoward medical occurrence in an infant to whom a test article was administered in a clinical investigation; the event did not necessarily have a causal relationship to the test formula. An adverse event could be any unfavorable and unintended sign (including an abnormal laboratory finding), symptom, or disease temporally associated with the use of a study formula, whether or not it was considered related to the study formula.

Less than half of the infants in the experimental and control groups had adverse events considered to be formula-related (42 [42.9%] and 44 [46.3%], respectively). The most common formula-related adverse events for all infants were flatulence (34 infants), constipation (30 infants), and vomiting (26 infants). In both groups, 17 infants had formula-related flatulence. Formula-related constipation occurred more often in infants in the experimental group (19) than in infants in the control group (11). Formula-related vomiting occurred in 12 infants in the experimental formula group and in 14 infants in the control formula group. Twice as many infants in the control group as in the experimental group experienced formula-related diarrhea (8 vs. 4).

No infants in the present formula group had formula-related adverse events of the respiratory system, and three infants (3.2%) in the control group had such events. Overall, the adverse event profiles of the two study formulas were similar.

Protein status (serum albumin, blood urea nitrogen (BUN), and creatinine) were secondary safety endpoints measured at baseline and at Week 12. The present formula group was fed a lower protein quantity (1.4 grams Protein/100 mL) than the control group (1.5 grams Protein/100 mL). Both study groups had a similar adequate protein status at the 12-week end of the study as defined by serum albumin levels (4.1 mg/dl in both groups). Comparable growth and serum albumin status indicate adequate protein nutrition from the alpha-lactalbumin rich formula despite lower total protein content. At study completion, the experimental group had lower BUN levels than the control group (8.2 mg/dl vs. 9.3 mg/dl), indicating a high quality protein source and reduced need for excess protein removal.

Acceptability and tolerance data are summarized in Table 10. Both the experimental and control formulas were acceptable and well tolerated by most of the infants at all study time points. At all time points after Week 2, acceptability and tolerance were slightly greater in infants who received the present formula. The percentage of infants whose overall acceptability and tolerance of study formula was satisfactory ranged from 90% at Week 2 to 100% at Weeks 10 and 12 for infants who received the improved formula and ranged from 85.9% at Week 4 to 98.4% at Week 10 for infants who received the control formula. Unacceptable ratings ranged from 0-10% in the improved formula group (average 4.1%) and from 1.6-14.1% in the control group (average 7.0%). The data indicates that the improved formula provides enhanced protein nutrition and formula acceptability.

TABLE 10

Summary of Acceptability and Tolerance of the Study Formula

| Time Point Overall Acceptability and Tolerance | Experimental Formula (N = 98) | | Control Formula (N = 95) | |
|---|---|---|---|---|
| | n | (%)* | n | (%)* |
| Week 2 | | | | |
| Satisfactory | 81 | (90.0) | 82 | (95.3) |
| Unsatisfactory | 9 | (10.0) | 4 | (4.7) |
| Week 4 | | | | |
| Satisfactory | 81 | (91.0) | 73 | (85.9) |
| Unsatisfactory | 8 | (9.0) | 12 | (14.1) |

TABLE 10-continued

Summary of Acceptability and Tolerance of the Study Formula

| Time Point<br>Overall Acceptability and | Experimental<br>Formula<br>(N = 98) | | Control<br>Formula<br>(N = 95) | |
|---|---|---|---|---|
| Tolerance | n | (%)* | n | (%)* |
| Week 6 | | | | |
| Satisfactory | 77 | (97.5) | 61 | (92.4) |
| Unsatisfactory | 2 | (2.5) | 5 | (7.6) |
| Week 8 | | | | |
| Satisfactory | 75 | (97.4) | 64 | (88.9) |
| Unsatisfactory | 2 | (2.6) | 8 | (11.1) |
| Week 10 | | | | |
| Satisfactory | 69 | (100.0) | 61 | (98.4) |
| Unsatisfactory | 0 | (0.0) | 1 | (1.6) |
| Week 12 | | | | |
| Satisfactory | 72 | (100.0) | 61 | (96.8) |
| Unsatisfactory | 0 | (0.0) | 2 | (3.2) |

*Percentages at each visit are calculated from the number of infants who contributed data at that time point.

EXAMPLE 5

Assessment of Adverse Events

A prospective, multi-center, masked, randomized clinical trial was undertaken to compare the plasma essential amino acid levels of a standard whey-dominant control infant formula (CF) with that of an experimental formula (EF) containing lower total protein and increased alpha-lactalbumin concentrations and that of human milk-fed infants (HM). The study was conducted in accordance with Good Clinical Practice (GCP), The International Conference Harmonization (ICH), and the Declaration of Helsinki (ICH). The Institutional Review Boards (IRBs) of the participating centers approved the study protocol. Written informed consent was obtained from the parent or legal guardian of each infant before enrollment into the study. The study tested the hypotheses that infants fed EF will have more comparable plasma essential amino acid levels to HM than compared to infants fed the CF.

Infants ≦14 days post-natal age were included if they were healthy, born at term, and appropriate for gestational age; had weight and length at birth within the 10th and 90th percentiles for age according to growth charts provided by the Center for Disease Control (CDC); had weight and length at enrollment within the 10th and 90th percentiles for age according to CDC growth charts; and were exclusively fed infant formula or exclusively breast-fed. Infants in the formula groups were excluded if they were partially or exclusively fed human milk within two days of enrollment; were routinely fed either baby food or solid foods; had siblings with feeding problems that had necessitated a change from a bovine milk-based formula to a protein hydrolysate or soy formula; had conditions that required feedings other than those specified in the protocol; had any major congenital malformation; had suspected or documented systemic or congenital infections (such as HIV); had cardiac, respiratory, hematological, gastrointestinal, or other systemic diseases; or had participated in another clinical trial. All routine immunizations, vitamin supplements, and over-the-counter medications were permitted. Mineral, protein, and herbal supplements (except fluoride) were prohibited. As discussed below, a total of 216 infants were enrolled in the study.

Total protein concentration was 14 g/L in the EF formula and 15 g/L in the CF formula. The alpha-lactalbumin-enriched whey fraction amino acid concentration of EF was similar to that of HM (Table 11). The beta-lactoglobulin concentration of EF was substantially reduced in comparison to CF and other current whey-dominant infant formulas. No free amino acids were added to either formula. Final formula concentration of alpha-lactalbumin was 2.2 g/L in EF and 1.2 g/L in CF. The non-protein nitrogen (NPN) content of EF ranged from 1.52% to 24.67% with a mean of 12.61%. The NPN content of CF ranged from 7.66% to 22.26% with a mean of 16.55%. The fat content of the formulas was the same (3.6 g/L). EF and CF had identical levels of vitamins, nucleotides, taurine, and the long-chain omega-3 and omega-6 polyunsaturated fatty acids, docosahexaenoic and arachidonic acids. Calcium concentration of EF was 420 mg/L, slightly lower than that of CF, 460 mg/L. Both formulas were manufactured by Wyeth Nutrition and supplied in 250 mL Ready-to-Feed Tetrabrik® packs (Askeaton, Ireland). To ensure blinding, EF was labeled with one of two different colors and CF was labeled with one of two different colors. The sponsors, investigators and parents were not aware of which formula each infant consumed.

TABLE 11

Essential Amino Acid Patterns of Human Milk and Study Formulas

| Amino Acid (g/100 g protein) | HM* | Experimental** | Control** |
|---|---|---|---|
| Arginine | 4.0 | 3.6 | 3.7 |
| Cystine | 1.8 | 1.9 | 1.5 |
| Histidine | 2.6 | 2.5 | 2.5 |
| Isoleucine | 5.3 | 5.7 | 5.8 |
| Leucine | 10.0 | 9.9 | 9.4 |
| Lysine | 6.8 | 7.5 | 7.5 |
| Methionine | 1.6 | 2.2 | 2.4 |
| Phenylalanine | 4.2 | 4.5 | 4.1 |
| Threonine | 4.7 | 5.4 | 5.4 |
| Tryptophan | 1.8 | 1.8 | 1.5 |
| Tyrosine | 4.5 | 4.1 | 3.6 |
| Valine | 5.7 | 6.0 | 5.8 |

*Literature average.
**internal data.

A computerized randomization/enrollment system was used to assign study formula. Infants were randomly assigned to receive either EF or CF and received feedings ad libitum for 8 weeks. The HM group was assigned study numbers, but not randomized. If an infant was withdrawn from the study, the randomization number and corresponding formula assignment were not reassigned to another infant.

Primary efficacy parameters were post-prandial plasma essential amino acid levels (arginine, cysteine, histidine, isoleucine, leucine, lysine, methionine, phenylalanine, threonine, tryptophan, tyrosine, and valine) at Week 8. Blood samples had to be collected precisely between 1.5 to 2.5 hours after each infant's most recent study feeding (HM or study formula) to best reflect plasma levels from their protein intake (Wu P Y K, Edwards N, Storm M C. Plasma amino acid pattern in normal term breast-fed infants. J Pediatr 1986;109: 347-349). All blood samples were sent to Mayo Central Laboratory for Clinical Trials (Rochester, Minn.). Amino acid analysis was conducted by automated ion-exchange chromatography and compared to reported normative values (LePage N, McDonald N, Dallaire L, Lambert M. Age-specific distribution of plasma amino acid concentrations in a healthy pediatric population. Clin Chem 1997;43:2397-2402).

Primary safety measurements were the adverse events associated with each study feeding and growth. An adverse event was defined as any pathological or unintended change in anatomic, metabolic, or physiologic functioning while taking a study feeding (including HM). These changes were reflected by physical signs, reported symptoms, or laboratory data. Primary safety end points were recorded during scheduled visits at weeks 4, 8, and by telephone contacts at weeks 2, 6, and 10. Infant weight (g), length (cm), weight-for-length ratio, and head circumference (cm) was measured at baseline and weeks 4 and 8. Weight and length measurements required two trained examiners who repeated each measurement twice to confirm accuracy using the same digital scales, length boards, and head circumference tapes across study sites. Infants were weighed without diapers to the nearest 0.01 kg. Supine length measurements required that an assistant hold the head in position while the torso and legs were positioned for measurement (Johnson T S, Engstrom J L, Gelhar D K. Intra- and inter-examiner reliability of anthropometric measurements of term infants. JPGN 1997;24:497-505; Zemel B S, Riley E M, Stallings V A. Evaluation of methodology for nutritional assessment in children. Annu Rev Nutr 1997;17: 211-53). Assessments were done up to 3 days before enrollment and within ±3 days of other time points. Validity has been established for this method (Peerson J M, Heing J M, Nommsen L A, et al. Use of growth models to describe patterns of length, weight, and head circumference among breast-fed and formula-fed infants: The Darling Study. Human Biology 1993;4:611-26; Victora C G, Morris S S, Barros F C, et al. The NCHS reference and the growth of breast- and bottle-fed infants. J Nutr 1998;128:1134-8).

Secondary safety end points were serum protein measurements of serum albumin, creatinine and blood urea nitrogen, and the acceptability and tolerance of study formula. Blood samples were drawn at baseline and at week 8.

Data were analyzed according to the intent-to-treat (ITT) principle. The ITT set included data from all infants who entered the study and received at least one feeding of study formula. All data were analyzed using SAS® statistical software (SAS Institute Inc., SAS® Version 6.12 software, Cary, N.C.). Categorical variables were summarized with frequencies and percentages. Continuous variables were summarized with sample number (n), mean, standard deviation (SD), and 95% confidence interval around the mean. The mean three-way analysis of variance (ANOVA) and three-way covariance (ANCOVA) were used to assess: plasma amino acid concentrations and anthropometric data (weight, length, and head circumference) at birth, baseline and weeks 4 and 8; gestational age and gender at baseline; protein status (albumin) and laboratory safety data at baseline and week 8. Tukey-adjusted comparisons of the least square means were used to show differences between two study groups for amino acid concentrations.

Weight-for-age ratios at baseline and weeks 4 and 8 were used to assess body weight of study infants relative to CDC reference curves (Kuczmarski R J, Ogden, C L, Grummer-Strawn, L M, et al. CDC growth charts: United States. Advance data from vital and health statistics; no. 314. Hyattsville, Md.: National Center for Health Statistics, 2000; Dibley M J, Goldsby J B, Staehling N W, et al. Trowbridge F L. Development of normalized curves for the international growth reference: historical and technical considerations. Am J Clin Nutr 1987;46:736-48). CDC reference data was used to analyze this data because it looked at a population of comparable racial and ethnic diversity and the reference data includes a mixture of formula-fed and breast-fed infants. Length-for-age, and weight-for-length Z scores were evaluated at baseline and week 8. Epi-Info 2000 software (version 1.1) was used to determine Z score values (Epi Info [computer program]. Version 1.0. Atlanta: Centers for Disease Control and prevention; 2000). Any infant with a missing value for a particular variable was not included in the analyses involving that variable.

Two hundred sixteen infants were enrolled from 12 study sites over an 18-month enrollment period. From the 12 study sites, the number of infants randomized to EF and CF groups were almost equal; however, one site had no HM-fed infants enrolled. One site enrolled three times as many infants equally distributed to the three groups as the remaining sites. Of the 216 enrolled infants in the study, 64 (29.5%) received EF, 64 (29.5%) received CF, and 88 received HM (41%). Forty-three (67.2%) infants fed CF, 49 (76.6%) fed EF, and 74 (84.1%) fed HM completed the study. The most common reason for study discontinuation was due to adverse events. Fourteen of 64 infants (21.9%) in the CF group discontinued due to an adverse event, compared to seven of 64 infants (10.9%) in the EF group. No infants in the HM group discontinued due to an adverse event.

Infant demographic and disposition data are summarized in Table 12. Thirty-four (53.1%) infants in the CF group and 35 (54.7%) in the EF group were females (NS). The mean birth weight, length, and head circumference were similar across all 3 groups. The mean gestational age of the HM infant group was higher than the two formula groups (p=0.036).

TABLE 12

Enrolled Infant Demographic Characteristics and Disposition

|  | Control Mean [SD] | Experimental Mean [SD] | Human Milk Mean [SD] | Total |
|---|---|---|---|---|
| Enrolled | 64 | 64 | 88 | 216 |
| Completed (%) | 43 (67.2) | 49 (76.6) | 74 (84.1) | 166 (76.9) |
| Age at enrollment (days) | 9.8 [3.8] | 9.3 [3.9] | 10.1 [3.4] | 9.8 [3.7] |
| Gestational age (wk) | 38.9 | 38.9 | 39.3 | 39.1 |
| Female (%) | 34 (53.1) | 35 (54.7) | 49 (55.7) | 118 (54.6) |
| Birth weight (g) | 3342 [442.7] | 3430 [444.9] | 3521 [447.6] | 3441 [449.5] |
| Birth length (cm) | 50.2 [2.4] | 50.4 [2.5] | 51.0 [2.4] | 50.6 [2.4] |
| Birth head circumference (cm) | 34.3 [1.6] | 34.4 [1.5] | 34.8 [1.7] | 34.6 [1.6] |

TABLE 12-continued

Enrolled Infant Demographic Characteristics and Disposition

|  | Control Mean [SD] | Experimental Mean [SD] | Human Milk Mean [SD] | Total |
|---|---|---|---|---|
| Study disposition (%) | | | | |
| Discontinued study* (Reason for study discontinuation) | 21 (32.8) | 15 (23.4) | 14 (15.9) | 50 (23.1) |
| Adverse event**¶ | 14 (21.9) | 7 (10.9) | 0 (0) | 21 (9.7) |
| Protocol violation | 2 (3.1) | 2 (3.1) | 8 (9.1) | 12 (5.6) |
| MD/family request | 3 (4.7) | 3 (4.7) | 3 (3.4) | 9 (4.2) |
| Lost to follow-up | 1 (1.6) | 3 (4.7) | 1 (1.1) | 5 (2.3) |
| Other | 1 (1.6) | 0 (0) | 2 (2.3) | 3 (1.4) |

*More than one reason could be listed for discontinuation.
**More than one adverse event could be listed for discontinuation.

FIG. 1 represents an aminogram of the mean plasma essential amino acids at week 8 among infants receiving CF, EF, and HM for the intent-to-treat analysis and FIG. 2 shows the percent difference of the mean plasma essential amino acids for study formula groups compared to the HM group. The mean post-prandial plasma essential amino acid concentration for the EF group was statistically equivalent to that for the HM group for arginine and cysteine. The mean concentration was higher (ranging from 10.7% for tryptophan to 61.4% for threonine) for the EF group than for the HM group for all ten remaining essential amino acids. These differences were statistically significant for all remaining essential amino acids except tryptophan. Generally, these results were consistent for both males and females, and across study sites. The mean post-prandial plasma amino acid concentration was higher (ranging from <0.01% for methionine to 27.2% for cysteine) for the EF group than for the CF group for all 12 essential amino acids. This difference was statistically significant for phenylalanine and tyrosine. The mean post-prandial plasma essential amino acid concentration was lower (ranging from <0.01% for tyrosine to 16.8% for cysteine) for the CF group compared to the HM group for arginine, cysteine, tryptophan, and tyrosine. These differences were statistically significant for arginine and cysteine. The mean plasma concentration was higher (ranging from 1.6% for leucine to 52.6% for threonine) for the CF group compared to the HM group for the remaining 8 essential amino acids. These differences were statistically significant for isoleucine, lysine, methionine, phenylalanine, threonine, and valine.

The mean ratio of tryptophan concentration to large neutral amino acids (LNAAs) concentration (isoleucine, leucine, phenylalanine, tryptophan, tyrosine, and valine) was higher for the HM group (11.5%) than for either of the two formula-fed groups (10.2% for the CF group, 10.4% for the EF group). The difference was statistically significant ($p=0.027$) among the treatment groups, however, Tukey-adjusted comparisons of the least square means failed to show a statistically significant difference between any combination of paired comparisons of the three groups.

There were no significant differences between the two formula groups in mean study formula intake (CF versus EF at 4 weeks: 31.5 oz./day versus 30.6 oz./day, respectively and at 8 weeks: 34.4 oz/day versus 33.0 oz./day, respectively). The number of infants receiving study formula and the amount of formula consumed was similar between the two formula groups.

The numbers and types of adverse events (AEs) reported for infants were primary safety endpoints in this study. Of the 216 infants enrolled, 177 (81.9%) experienced at least one AE. There was no statistically significant difference in the number of infants reporting an AE across the treatment groups. The most common body system for AEs was the gastrointestinal (GI) system with 97 of 216 infants (44.9%) experiencing at least one GI AE: 36 of 64 infants (56.3%) in the CF group, 25 of 64 infants (39.1%) in the EF group, and 36 of 88 infants (40.9%) in the HM group experienced at least one GI AE. The most common GI AEs were eructation, 14.8% (32/216), constipation, 11.1% (24/216) [HM, 6 constipation AEs, EF, 6 constipation AEs, and CF, 12 constipation AEs (not statistically significant)], gastroesophageal reflux disease, 9.7% (21/216), abdominal pain, 6.0% (13/216), vomiting, 6.0% (13/216), diarrhea, 5.6% (12/216), and regurgitation, 5.1% (11/216). Although the incidence of GI AEs was higher in the CF group than in the EF or HM groups, there was no statistically significant difference in incidence of GI AEs across treatment groups ($p=0.092$).

Treatment-related GI AEs were reported for 43 of 216 infants (19.9%) and there was a statistically significant difference ($p=0.025$) across treatment groups in the incidence of treatment-related GI AEs. Twenty of 64 infants (31.3%) in the CF group, 11 of 64 infants (17.2%) in the EF group, and 12 of 88 infants (13.6%) in the HM group experienced treatment-related GI AEs. Fisher's exact test showed a statistically significant difference ($p=0.015$) between the CF group and the HM group. FIG. 3 depicts for each treatment group the incidence of infants that experienced GI AEs of any causality and the incidence of infants that experienced feeding-related GI AEs.

Of 216 enrolled infants, 20 (9.3%) were withdrawn from the study due to GI AEs. There was a statistically significant difference ($p<0.001$) across treatment groups in the incidence of withdrawals due to GI AEs. Thirteen of 64 infants (20.3%) in the CF group were discontinued due to GI AEs, compared to 7 of 64 infants (10.9%) in the EF group, and none in the HM group. Fisher's exact test showed a statistically significant difference between the CF group and the HM group ($p<0.001$) and between the EF group and the HM group ($p=0.002$). One of 64 infants (1.6%) in the EF group was discontinued due to a serious GI AE that was clearly not related to study feeding. Calculation of the crude incidence of GI AEs tends to underestimate the "true" incidence. Kaplan-Meier estimates of the cumulative incidence of GI AEs were calculated to provide a more conservative assessment.

Kaplan-Meier estimates of the cumulative incidence of GI AEs are displayed versus time in FIG. 4. The log-rank test indicates a statistically significant difference (p=0.013) in the cumulative incidence across the three treatment groups. The cumulative incidence is estimated to be 60.7% for the CF group, 41.2% for the EF group, and 48.6% for the HM group.

Eleven of 216 infants (5.1%) were discontinued due to a treatment-related GI AE. There was a statistically significant difference (p=0.001) across treatment groups with 8 of 64 infants (12.5%) in the CF group discontinued due to a treatment-related GI AE, compared to 3 of 64 infants (4.7%) in the EF group, and none in the HM group. Fisher's exact test showed a statistically significant difference (p=0.001) between the CF group and the HM group. FIG. 5 depicts for each treatment group the incidence of infants withdrawn from the study due to GI AEs of any causality and the incidence of infants withdrawn due to feeding-related GI AEs.

Evaluations of infant formula protein formulations use plasma amino acid response of the term HM infant as a standard for assessing adequacy of protein sources (Sarwar G, Darling P, Ujie M, Botting H G, Pencharz P B. Use of amino acid profiles of preterm and term human milks in evaluating scoring patterns for routine protein quality assessment of infant formulas. J AOAC International 1996;79:498-502). However, in a recent study, Kurugol and colleagues observed that newborn infants fed either human milk or formula (whey:casein ratio of 60:40) with similar protein and amino acid concentrations did not produce identical patterns of amino acids or indices of protein metabolism (Kurugol Z, Coker M, Coker C, Egemen A, Eroz B. Comparison of growth, serum prealbumin, IgG and amino acids of term infants fed breast milk or formula. Turk J Pediatr 1997;39:195-202). This study obtained blood samples 2.5 to 3 hours after the previous feeding. These findings support the inference that plasma amino acid levels are difficult to interpret.

Plasma amino acid homeostasis involves the net movement of amino acids that depends on the physiological state and nutritional condition of the infant. Inter-organ amino acid flux occurs for 4 reasons: 1) the body is unable to store amino acids so excess dietary amino acids not needed for protein synthesis are rapidly catabolized (Brosnan J T. Interorgan amino acid transport and its regulation. J Nutr 2003;133:2068S-2072S; Cynober L A. Plasma amino acid levels with a note on membrane transport: characteristics, regulation, and metabolic significance. Nutrition 2002;18:761-766); 2) amino acid catabolism occurs in a manner that does not increase blood ammonia by nontoxic transport to the liver; 3) most amino acids are glucogenic that creates a flux of amino acids to gluconeogenic organs when there is a need to produce glucose; and 4) amino acid fluxes underlie specific organ functions (substrate supply, enzyme activity, transporter activity, and competitive inhibition of transport) (Brosnan J T. Interorgan amino acid transport and its regulation. J Nutr 2003;133:2068S-2072S). There is no single means of regulating amino acid fluxes. Thus the interpretation of plasma amino acids levels is not simply based upon dietary intake of protein but on a combination of intake, tissue transfer, and tissue production or 'fluxes' (Cynober L A. Plasma amino acid levels with a note on membrane transport: characteristics, regulation, and metabolic significance. Nutrition 2002; 18:761-766.). Ideally, measuring plasma amino acids at the basal state and then again in the post-absorptive state or via stable isotopes gives a more accurate view, however, these techniques are not feasible for large numbers of infants in a multi-center study. Even isotope measurement of amino acid balance is fraught with problems such as: 1) the amount of 'tracer' is excessive and may influence balance and 2) the relationship between the indirect measure of adequacy, meaning the postprandial oxidation rate and overall balance is unknown (Millward D J. Metabolic demands for amino acids and the human dietary requirement. J Nutr 1998;128:2563S-2576S).

The protein concentrations of the CF and EF (15 g/L versus 14 g/L, respectively) had a 7% difference. Infant intake at 4 weeks (31.5 oz./day versus 30.6 oz./day, respectively) and 8 weeks (34.4 oz/day versus 33.0 oz./day, respectively) were similar, yet the mean post-prandial (1.5 to 2.5 hours) essential plasma amino acid concentrations were higher in the EF group for all 12 essential amino acids compared to the CF group. Estimated protein intake from study formulas at week 4 and 8 are in Table 13. The protein/energy ratios of the study feedings were within scientific guidelines and what is considered safe (Fomon S J, Ziegler E E, Nelson S E, Frantz J A. What is the safe protein-energy ratio for infant formulas? Am J Clin Nutr 1995;62:358-363; Raiha N C R and Axelsson I E. Protein intake during infancy. Scand J Nutr 1996;40:151-155; Fomon S J, Ziegler E E, Nelson S E, Rogers R R, Frantz J A. Infant formula with protein-energy ratio of 1.7 g/100 kcal is adequate but may not be safe. JPGN 1999;28:495-501; Raiha N C R, Fazzolari-Nesci A, Cajozzo C, Pucci G, Monestier A, Moro G, et al. Whey predominant, whey modified infant formula with protein/energy ratio of 1.8 g/100 kcal: adequate and safe for term infants from birth to four months. JPGN 2002;35:275-281) (Table 14). The 7% reduction in total protein of EF resulted in protein intakes from EF and CF higher than estimated HM intake (Table 13) and partially accounts for the higher amino acid levels in EF and CF compared to the HM group.

TABLE 13

Estimated Protein Intakes During Study Periods

| | Experimental formula (14 g protein/L) | Control formula (15 g protein/L) | Human Milk (9-11 g protein/L) |
| --- | --- | --- | --- |
| Mean Weight (kg) | | | |
| Week 4 | 4.61 | 4.54 | 4.79 |
| Week 8 | 5.58 | 5.40 | 5.64 |
| Mean Intake (oz.) | | | |
| Week 4 | 30.6 | 31.5 | N/A (estimated: 31.1) |
| Week 8 | 33.0 | 34.4 | N/A (estimated: 33.7) |

TABLE 13-continued

Estimated Protein Intakes During Study Periods

| | Experimental formula (14 g protein/L) | Control formula (15 g protein/L) | Human Milk (9-11 g protein/L) |
|---|---|---|---|
| | Estimated Protein Intake (g/kg/day) | | |
| Week 4 | 2.79 (12.9 g/d) | 3.12 (14.2 g/d) | 1.75-2.14 (8.4-10.3 g/d) |
| Week 8 | 2.48 (13.8 g/d) | 2.87 (15.5 g/d) | 1.61-1.97 (9.1-11.1 g/d) |
| | Protein-Energy Ratio (g protein/100 kcal) | | |
| Study | 2.08 | 2.23 | ~1.75 |
| | Estimated True Protein Intake (grams/day) | | |
| Week 4 | 12.9 | 14.2 | 8.4-10.3 |
| NPN (30% used for pro synthesis) | −1.1 | −1.6 | −1.5-1.8 |
| | 11.8 | 12.6 | 6.9-8.5 |
| Week 8* | 13.8 | 15.5 | 9.1-12.1 |
| NPN (30% used for pro synthesis) | −1.2 | −1.8 | −1.6-2.1 |
| | 12.6* | 13.7* | 7.5-10.0* |

*Time point when plasma essential amino acid levels were measured.

TABLE 14

Revised Estimates for Average Requirements and Safe Levels of Protein Intake for Infants

| Age Interval (months) | Protein Requirements 1985 Total Protein* (g/kg/d) | FAO/ WHO/ UNU (g/kg/d) | Safe Levels Pro- tein** (g/kg/d) | Protein- Energy*** (minimum) (g/100 kcal) | Recommendation 2002 DRI* Protein (g/kg/d) |
|---|---|---|---|---|---|
| 0-1 | 1.99 | — | 2.69 | 1.8-2.2 | 1.52 (9.1 g/day) |
| 1-2 | 1.54 | 2.25 | 2.04 | 1.56-2.2 | 1.52 (9.1 g/day) |
| 2-3 | 1.19 | 1.82 | 1.53 | 1.44-2.2 | 1.52 (9.1 g/day) |
| 3-4 | 1.06 | 1.47 | 1.37 | 1.25-1.6 | 1.52 (9.1 g/day) |
| 4-5 | 0.98 | 1.34 | 1.25 | | 1.52 (9.1 g/day) |
| 5-6 | 0.92 | 1.30 | 1.19 | | 1.52 (9.1 g/day) |

*adapted from Dewey KG, Beaton G, Fjeld C, Lonnerdal B, Reeds P. Protein requirements of infants and children. Eur J Clin Nutr 1996; 50: 5119-5150
**adapted from Institute of Medicine. Dietary Reference Intakes for Energy, Carbohydrate, Fiber, Fat, Fatty Acids, Cholesterol, Protein, and Amino acids (Macronutrients). Washington, DC: National Academy Press, 2002
***adapted from Fomon SJ, Ziegler EE, Nelson SE, Frantz JA. What is the safe protein-energy ratio for infant formulas? Am J Clin Nutr 1995; 62: 358-363; Raiha NCR and Axelsson IE. Protein intake during infancy. Scand J Nutr 1996; 40: 151-155; Fomon SJ, Ziegler EE, Nelson SE, Rogers RR, Frantz JA. Infant formula with protein-energy ratio of 1.7 g/100 kcal is adequate but may not be safe. JPGN 1999; 28: 495-501; Raiha NCR, Fazzolari-Nesci A, Cajozzo C,Pucci G, Monestier A, Moro G, et al. Whey predominant, whey modified infant formula with protein/energy ratio of 1.8 g/100 kcal: adequate and safe for term infants from birth to four months. JPGN 2002; 35: 275-281.

Protein intake and requirement also has contribution from the non-protein nitrogen (NPN) fraction that consists of urea, taurine, nucleotides, glutamine, and oligosaccharides. In human milk, NPN comprises about 25% of the total nitrogen compared to only about 5-16% in cow's milk (Donovan S M, Lonnerdal B., Non-protein nitrogen and true protein in infant formulas. Acta Paediatr Scand 1989;78:497-504). The large variation of NPN seen in cow's milk formula is due to the treatment of the protein raw material (ion exchange, electrodialysis, or ultrafiltration of whey) (Donovan S M, Lonnerdal B. Non-protein nitrogen and true protein in infant formulas. Acta Paediatr Scand 1989;78:497-504; Rudolf S and Kunz C. Protein and nonprotein nitrogen components in human milk, bovine milk, and infant formula: quantitative and qualitative aspects in infant nutrition. JPGN 1997;24: 328-344). Because the NPN in CF (16.55%) was higher than the NPN of EF (12.61%), the hypothetical bioavailability of protein (true protein) is closer thereby decreasing the differences between study formulas (Table 13).

When comparing EF and CF study formulas, the +20% range, in FIG. 3, was selected for a comparison range of HM amino acid equivalency and not for safety. For example, the threonine level for EF was 161.4% of the human milk threonine level. Kurugol and colleagues also measured plasma threonine levels 125.5% greater in the whey-dominant formula group compared to the human milk-fed group (Kurugol Z, Coker M, Coker C, Egemen A, Eroz B. Comparison of growth, serum prealbumin, IgG and amino acids of term infants fed breast milk or formula. Turk J Pediatr 1997;39: 195-202). Darling and colleagues measured threonine via stable isotopes in preterm infants fed 3 different whey:casein ratios or preterm mother's milk (Darling P B, Dunn M, Sarwar G, Brookes S, Ball OR, Pencharz P B. Threonine kinetics in preterm infants fed their mother's milk or formula with various ratios of whey to casein. Am J Clin Nutr 1999;69: 105-114). They also found that plasma threonine levels were much higher in the higher whey dominant formula fed infants as compared to the HM-fed threonine levels. There was difference between fecal threonine excretion and net threonine tissue gain however, threonine oxidation was significantly lower in the formula-fed infants as compared to the HM-fed infants (Darling P B, Dunn M, Sarwar G, Brookes S, Ball O R, Pencharz P B. Threonine kinetics in preterm infants fed their mother's milk or formula with various ratios of whey to casein. Am J Clin Nutr 1999;69:105-114). Darling and colleagues have confirmed this same mechanism, of lower amino acid oxidation in formula-fed infants compared to human milk-fed infants, in a recent study where they fed casein-dominant formula known to produce higher plasma phenylalanine levels as compared to human milk in preterm infants (Darling P B, Dunn M, Sawar Gilani G, Ball R O, Pencharz P B. Phenylalnine kinetics differ between formula-fed and human milk-fed preterm infants. J Nutr 2004;134:2540-2545).

Humans are able to adapt to higher protein/amino acid intake in comparison to requirements since frank signs or symptoms of amino acid excess are rarely, if at all, observed under usual dietary conditions (Bier D M. Amino acid pharmacokinetics and safety assessment. J Nutr 2003;2034S-2039S). However, because most amino acids are gluconeogenic (Brosnan J T. Interorgan amino acid transport and its regulation. J Nutr 2003;133:2068S-2072S; Cynober L A. Plasma amino acid levels with a note on membrane transport: characteristics, regulation, and metabolic significance. Nutrition 2002;18:761-766), there has been a growing rise in concern of over-feeding protein to infants and the risk for later obesity and diabetes (Zetterstrom R, Ginsberg B E, Lindbald B S, Persson B. Relation between protein intake, plasma valine, and insulin secretion during early infancy. Klin Padiat 1985;197:371-374; McClellan R and Novak D. Fetal nutrition: how we become what we are. JPGN 2001;33:233-244). These higher mean plasma essential amino acid levels for EF provides data to support the feasibility and opportunity of lowering the infant formula protein content further.

Formula tolerability is frequently assessed by the comparison of the numbers and kinds of GI AEs (Alarcon P A, Tressler R L, Mulvaney A, Lam W, Comer G M. Gastrointestinal tolerance of a new infant milk formula in healthy babies: an international study conducted in 17 countries. Nutrition 2002; 18:484-489; Lloyd B, Halter R J, Kuchan M J, Bags G E, Ryan A S, Masor M L. Formula tolerance in post-breastfed and exclusively formula-fed infants. Pediatrics 1999; 103: E7). The EF group demonstrated superior GI tolerance as shown from fewer GI AEs and the observation that the pattern of cumulative incidence GI AEs of the EF group and HM group mirror each other (have the same GI AE profile) after day 19 of the study (FIG. 3). GI AEs are typical to all infants whether breast-fed or formula-fed (Lloyd B, Halter R J, Kuchan M J, Bags G E, Ryan A S, Masor M L. Formula tolerance in post-breastfed and exclusively formula-fed infants. Pediatrics 1999; 103:E7). Unique to this study was that the GI AE cumulative profile imitated that of the human milk-feeding group. This outcome supports the results found in the previous alpha-lactalbumin growth and safety study where Lien and colleagues (Lien, E L, Davis, A M, and multi-center group. Growth and safety of a reduced protein formula enriched with bovine alpha-lactalbumin in term infants. JPGN 2004;38: 170-176) found superior tolerance in the alpha-lactalbumin-enriched formula as demonstrated by fewer study withdrawals and higher satisfactory ratings compared to infants fed the control formula.

This study demonstrates that a lower protein infant formula with increased alpha-lactalbumin concentration supports a major improvement in the infant formula protein matrix to more closely match the total protein composition of HM. The formula enriched with alpha-lactalbumin delivered a high protein quality formula with lower total protein demonstrated by the measured equivalent or higher levels of essential amino acids. Surprise findings included the unexpected GI AEs and withdrawal results plus the cumulative incidence of GI AEs that clearly demonstrate the superiority of the alpha-lactalbumin-enriched formula in comparison to the CF.

The present invention may be embodied on other specific forms without departing from the spirit and essential attributes thereof and accordingly, reference should be made to the appended claims, rather than to the foregoing specification, as indicating the scope of the invention. All publications, patents and patent applications cited herein are hereby incorporated by reference in their entirety.

What is claimed is:

1. A method for reducing one or more side-effects of feeding an individual an infant formula, the method comprising administering to said individual a composition, wherein the composition comprises an amount of bovine milk providing 1.0 to 1.2 grams of protein per 100 available kilocalories and an amount of a bovine whey material providing 1.0 to 1.2 grams of protein per 100 available kilocalories, said bovine whey material having an alpha-lactalbumin content of 28% to 40% and a beta-lactoglobulin content of 8% to 33% of total protein.

2. The method of claim 1 wherein the bovine whey material of said composition has an alpha-lactalbumin content of 28% to 36% and a beta-lactoglobulin content of 10% to 29% of total protein.

3. The method of claim 2, wherein the most abundant whey protein of the composition is alpha-lactalbumin.

4. The method of claim 1 wherein the bovine whey material of said composition is further characterized by:
   (a) a non-protein nitrogen content of 15% or less of total nitrogen;
   (b) a total protein content of 12.5% to 95%;
   (c) a fat content of 15% or less; and
   (d) an ash content of 4.5% or less.

5. The method of claim 4 wherein the bovine whey material of said composition has a total protein content of 35% to 80%.

6. The method of claim 5, wherein the bovine whey material of said composition has a total protein content of 73% to 77%.

7. The method of claim 1, wherein the bovine whey material of said composition is further characterized by amino acid contents of no less than the following, in grams per 100 grams of total protein:
   (a) Arginine, 3.1;
   (b) Cystine, 1.4;
   (c) Histidine, 1.6;
   (d) Isoleucine, 1.0;
   (e) Leucine, 5.3;
   (f) Lysine 3.9;
   (g) Methionine, 0.3;
   (h) Phenylalanine, 1.2
   (i) Threonine, 3.2;
   (j) Tryptophan, 1.5;
   (k) Tyrosine, 0.9; and
   (l) Valine, 1.0.

8. The method of claim 1, wherein the amount of alpha-lactalbumin in said composition is no less than 2.2 grams per 670 available kilocalories (0.33 g/100 kcal).

9. The method of claim 1 wherein the side-effects are gastric side-effects.

10. The method of claim 1 wherein the subject is a human infant.

11. The method of claim 1 wherein side-effects are reduced by at least 20% in the subject as compared to a control subject.

12. The method of claim 11 wherein the control subject is administered an equivalent amount of a traditional infant formula.

13. The method of claim 1 wherein side-effects are reduced by at least 50% in the subject as compared to a control subject.

14. The method of claim 1 wherein the side-effect is selected from the group consisting of eructation, constipation, gastroesophogeal reflux disease, abdominal pain, vomiting, diarrhea and regurgitation.

15. The method of claim 1 wherein more than one side-effect is reduced in the individual.

16. The method of claim 1 further comprising administering an amount of one or more traditional infant formulas.

17. A method of producing a food composition, the method comprising:
(a) adding an amount of skim milk sufficient to provide about X kg of protein to water to yield mixture 1;
(b) adding about 0.02528X kg of sodium citrate and 0.0144X kg potassium bicarbonate dissolved in water to mixture 1 to yield mixture 2;
(c) adding lactose and whey protein concentrate to mixture 2, thereby yielding mixture 3, wherein the amount of whey protein added is sufficient to provide about X kg of protein, said whey protein concentrate having an alpha-lactalbumin content of 28% to 40% and a beta-lactoglobulin content of 8% to 33% of total protein;
(d) adding about 0.00789X kg taurine dissolved in hot water to mixture 3, thereby yielding mixture 4;
(e) adding to mixture 4 alone or in combination, calcium carbonate, about 0.0243X kg; calcium hydroxide, about 0.00936X kg; potassium hydroxide, about 0.00511X kg; magnesium chloride, about 0.0181X kg; calcium chloride, about 0.0140X kg; potassium chloride, about 0.0197X kg; ferrous sulfate, about 0.00539X kg; about 0.00113X kg of a 1% potassium iodide triturate in lactose; 0.00893X kg of a 44.6% solution of zinc sulfate; about 0.0131X kg of a 2.5% solution of copper sulfate; about 0.0181X kg of a 2.5% solution of manganese sulfate, and about 0.000446X kg of a 0.3% sodium selenite triturate in potassium bicarbonate; thereby yielding mixture 5;
(f) heating mixture 5 to 96 +/− 2° C.;
(g) incubating mixture 5 at 96 +/− 2° C. for about 30 seconds;
(h) cooling mixture 5 to 66 +/− 2° C;
(i) homogenizing mixture 5; and
(j) cooling the homogenized mixture 5 to 5-10° C.

18. The method of claim 17 wherein X is about 28 kg.

19. A method of increasing a plasma tryptophan level in an individual comprising administering to said individual a composition, said composition comprising an amount of bovine milk providing 1.0 to 1.2 grams of protein per 100 available kilocalories and an amount of a bovine whey material providing 1.0 to 1.2 grams of protein per 100 available kilocalories, said bovine whey material having an alpha-lactalbumin content of 28% to 40% and a beta-lactoglobulin content of 8% to 33% of total protein.

* * * * *

UNITED STATES PATENT AND TRADEMARK OFFICE
CERTIFICATE OF CORRECTION

PATENT NO. : 7,651,716 B2  Page 1 of 1
APPLICATION NO. : 11/064994
DATED : January 26, 2010
INVENTOR(S) : Davis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1367 days.

Signed and Sealed this

Twenty-third Day of November, 2010

David J. Kappos
*Director of the United States Patent and Trademark Office*